US012322146B2

(12) United States Patent
Naganuma et al.

(10) Patent No.: US 12,322,146 B2
(45) Date of Patent: Jun. 3, 2025

(54) INFORMATION PROCESSING DEVICE AND METHOD

(71) Applicant: Sony Group Corporation, Tokyo (JP)

(72) Inventors: Tomoya Naganuma, Kanagawa (JP); Satoru Kuma, Tokyo (JP); Hiroyuki Yasuda, Saitama (JP); Ohji Nakagami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 76 days.

(21) Appl. No.: 18/271,332

(22) PCT Filed: Dec. 24, 2021

(86) PCT No.: PCT/JP2021/048120
§ 371 (c)(1),
(2) Date: Jul. 7, 2023

(87) PCT Pub. No.: WO2022/153835
PCT Pub. Date: Jul. 21, 2022

(65) Prior Publication Data
US 2024/0303871 A1 Sep. 12, 2024

(30) Foreign Application Priority Data
Jan. 14, 2021 (JP) ................. 2021-004274

(51) Int. Cl.
G06T 9/40 (2006.01)
(52) U.S. Cl.
CPC ...................... G06T 9/40 (2013.01)
(58) Field of Classification Search
CPC ........... G06T 9/40; G06T 9/001; G06T 9/004; G06T 9/00
See application file for complete search history.

(56) References Cited

U.S. PATENT DOCUMENTS

2011/0210971 A1* 9/2011 Palais ............... G06T 17/00
345/420
2015/0371431 A1* 12/2015 Korb ............... G06V 10/60
382/113
(Continued)

FOREIGN PATENT DOCUMENTS

WO WO 2020/071414 A1 4/2020
WO WO 2020/251888 A1 12/2020

OTHER PUBLICATIONS

Mekuria et al., Design, Implementation and Evaluation of a Point Cloud Codec for Tele-Immersive Video, IEEE Transactions on Circuits and Systems for Video Technology, Mar. 16, 2016, pp. 1-14, vol. 27, Issue 4.
(Continued)

Primary Examiner — Terrell M Robinson
(74) Attorney, Agent, or Firm — Paratus Law Group, PLLC

(57) ABSTRACT

The present disclosure relates to an information processing device and method capable of suppressing a reduction in coding efficiency.
For a point cloud representing a three-dimensional object as a set of points, a coordinate system for geometry data is transformed from a polar coordinate system to a Cartesian coordinate system, a reference relationship indicating a reference destination used to calculate a predictive value of attribute data of a processing target point is set by using the generated geometry data in the Cartesian coordinate system, a prediction residual that is a difference value between the attribute data of the processing target point and the predictive value calculated based on the set reference relationship is calculated, and the calculated prediction residual is encoded. The present disclosure can be applied to, for example, an information processing device, an encoding (Continued)

device, a decoding device, an electronic device, an information processing method, or a program.

20 Claims, 23 Drawing Sheets

(56) References Cited

U.S. PATENT DOCUMENTS

| | | | |
|---|---|---|---|
| 2018/0053324 A1* | 2/2018 | Cohen | G06T 9/005 |
| 2018/0268570 A1* | 9/2018 | Budagavi | G06T 9/001 |
| 2019/0122393 A1* | 4/2019 | Sinharoy | G06T 5/77 |
| 2019/0311502 A1* | 10/2019 | Mammou | G06F 16/9027 |
| 2021/0027505 A1* | 1/2021 | Yano | H04N 19/115 |
| 2021/0258617 A1* | 8/2021 | Tourapis | H04N 19/20 |

OTHER PUBLICATIONS

Gao et al., [G-PCC] [New proposal] Predictive Geometry Coding, International Organisation for Standardisation ISO/IEC JTC1/SC29/WG11 Coding of Moving Pictures and Audio, Oct. 2019, pp. 1-10, MPEG2019/m51012, Geneva, CH.

* cited by examiner

| 1 | TRANSFORM GEOMETRY DATA IN POLAR COORDINATE SYSTEM TO CARTESIAN COORDINATE SYSTEM FOR FORMATION OF REFERENCE STRUCTURE OF ATTRIBUTE DATA |
|---|---|
| 1-1 | FORM REFERENCE STRUCTURE BASED ON DISTANCE IN CARTESIAN COORDINATE SYSTEM |
| 1-2 | SET PARENT NODE AND GRANDPARENT NODE IN REFERENCE STRUCTURE FROM POINTS WHOSE GEOMETRY DATA HAVE BEEN DECODED |
| 1-3 | ENCODE/DECODE GEOMETRY DATA AND ATTRIBUTE DATA IN PREDICTIVE MODE |
| 1-3-1 | ENCODE OR DECODE GEOMETRY DATA AND ATTRIBUTE DATA FOR EACH NODE IN REFERENCE STRUCTURE |
| 1-3-2 | SET PREDICTION MODE FOR ATTRIBUTE DATA |
| 1-3-3 | SORT ATTRIBUTE DATA OF DUPLICATE POINTS |
| 1-3-4 | CALCULATE PREDICTION RESIDUAL USING WRAP AROUND |

FOR GEOMETRY TREE INFORMATION HAVING BEEN ENCODED IN ENCODING ORDER OF NODE, DECODE PREDICTION MODE, COEFFICIENT, AND POSITION OF GEOMETRY.

If(GeometryAngularMode != AttributeAngularMode){
   COORDINATE TRANSFORMATION
   RESOLVE REFERENCE SOURCE FROM DECODED POINTS
}

DECODE PREDICTION MODE AND COEFFICIENT OF ATTRIBUTE AND ATTRIBUTE

| Idx | x | y | z | Attribute | Residual |
|---|---|---|---|---|---|
| 0 | a | b | c | 5 | 5 |
| 1 | a | b | c | 1 | -4 |
| 2 | a | b | c | 4 | 3 |
| 3 | a | b | c | 2 | -2 |
| 4 | a | b | c | 3 | 1 |

$\sum |Res| = 15$

A

| Idx | x | y | z | Attribute | Residual |
|---|---|---|---|---|---|
| 0 | a | b | c | 1 | 1 |
| 1 | a | b | c | 2 | 1 |
| 2 | a | b | c | 3 | 1 |
| 3 | a | b | c | 4 | 1 |
| 4 | a | b | c | 5 | 1 |

$\sum |Res| = 5$

ENCODING WITHOUT Wrap around

Target=200
pred=0
residual=200 target−pred=residual
+255
+128
−128
−255

RESIDUAL WILL BE IN RANGE OF [−255, 255], REQUIRING 9 BITS FOR REPRESENTATION.

Attribute: UNSIGNED 8 BITS

Wrap around
FOR RESIDUAL OUT OF RANGE OF −128 to 127, 256 IS ADDED TO OR SUBTRACTED FROM RESIDUAL TO BRING IT BACK WITHIN THAT RANGE.

PROCESSING FOR ENCODING
residual = target − pred
if residual < −128:
    residual += 256
if residual > 127:
    residual −= 256

FOR EXAMPLE,
FOR pred = 200
AND target = 30,
THAT IS, FOR
residual = −170,
APPLY Wrap
around,
RESULTING IN
residual = 86.

⇧ PASS residual TO DECODER

PROCESSING FOR DECODING
recon = residual + pred
if recon < 0:
    recon += 256
if recon > 255:
    recon −= 256

Unwrap
FOR RECONSTRUCTED VALUE OUT OF RANGE OF 0 to 255, 256 IS ADDED TO OR SUBTRACTED FROM RECONSTRUCTED VALUE TO BRING IT BACK WITHIN THAT RANGE.

FOR residual = 86
AND pred = 200,
THAT IS, FOR
recon = 286,
APPLY Unwrap,
RESULTING IN
recon = 30.

INFORMATION PROCESSING DEVICE AND METHOD

CROSS REFERENCE TO PRIOR APPLICATION

This application is a National Stage Patent Application of PCT International Patent Application No. PCT/JP2021/048120 (filed on Dec. 24, 2021) under 35 U.S.C. § 371, which claims priority to Japanese Patent Application No. 2021-004274 (filed on Jan. 14, 2021), which are all hereby incorporated by reference in their entirety.

TECHNICAL FIELD

The present disclosure relates to an information processing device and method, and more particularly, to an information processing device and method capable of suppressing a reduction in encoding efficiency.

BACKGROUND ART

Hitherto, a method of encoding 3D data representing a three-dimensional structure such as a point cloud has been considered (for example, see NPL 1). Further, a method called predictive geometry has been considered in which when the geometry data of this point cloud is encoded, a difference value (prediction residual) from a predictive value is calculated and the prediction residual is encoded (for example, see NPL 2). In addition, for the predictive geometry, a mode has been considered in which the geometry data is represented by a polar coordinate system.

CITATION LIST

Non Patent Literature

[NPL 1]
R. Mekuria, Student Member IEEE, K. Blom, P. Cesar., Member, IEEE, "Design, Implementation and Evaluation of a Point Cloud Codec for Tele-Immersive Video", tcsvt_paper_submitted_february.pdf
[NPL 2]
Zhenzhen Gao, David Flynn, Alexis Tourapis, and Khaled Mammou, "[G-PCC][New proposal] Predictive Geometry Coding", ISO/IEC JTC1/SC29/WG11 MPEG2019/m51012, October 2019, Geneva, CH

SUMMARY

Technical Problem

However, polar coordinates, when referring to their relationship, tends to be farther from each other than that in the Cartesian coordinate system due to the impact of the order of LiDAR scanning. In contrast, attribute data tends to have a higher correlation as their distance is shorter. Therefore, in the case where a predictive value is calculated for attribute data from peripheral points and the prediction residual is encoded, the encoding efficiency in the polar coordinate system may be reduced compared to that in the Cartesian coordinate system.

The present disclosure has been devised in view of such circumstances to suppress a reduction in encoding efficiency.

Solution to Problem

An information processing device according to one aspect of the present technology includes: a coordinate transformation unit that transforms, for a point cloud representing a three-dimensional object as a set of points, a coordinate system for geometry data from a polar coordinate system to a Cartesian coordinate system; a reference relationship setting unit that sets, by using the geometry data in the Cartesian coordinate system generated by the coordinate transformation unit, a reference relationship indicating a reference destination used to calculate a predictive value of attribute data of a processing target point; a prediction residual calculation unit that calculates a prediction residual that is a difference value between the attribute data of the processing target point and the predictive value calculated based on the reference relationship set by the reference relationship setting unit; and a prediction residual encoding unit that encodes the prediction residual calculated by the prediction residual calculation unit.

An information processing method according to one aspect of the present technology includes: transforming, for a point cloud representing a three-dimensional object as a set of points, a coordinate system for geometry data from a polar coordinate system to a Cartesian coordinate system; setting, by using the generated geometry data in the Cartesian coordinate system, a reference relationship indicating a reference destination used to calculate a predictive value of attribute data of a processing target point; calculating a prediction residual that is a difference value between the attribute data of the processing target point and the predictive value calculated based on the set reference relationship; and encoding the calculated prediction residual.

An information processing device according to another aspect of the present technology includes: a coordinate transformation unit that transforms, for a point cloud representing a three-dimensional object as a set of points, a coordinate system for geometry data from a polar coordinate system to a Cartesian coordinate system; a reference relationship setting unit that sets, by using the geometry data in the Cartesian coordinate system generated by the coordinate transformation unit, a reference relationship indicating a reference destination used to calculate a predictive value of attribute data of a processing target point; a prediction residual decoding unit that decodes encoded data to calculate a prediction residual that is a difference value between the attribute data and the predictive value; and an attribute data generation unit that generates the attribute data by addition of the prediction residual calculated by the prediction residual decoding unit and the predictive value calculated based on the reference relationship set by the reference relationship setting unit.

An information processing method according to another aspect of the present technology includes: transforming, for a point cloud representing a three-dimensional object as a set of points, a coordinate system for geometry data from a polar coordinate system to a Cartesian coordinate system; setting, by using the generated geometry data in the Cartesian coordinate system, a reference relationship indicating a reference destination used to calculate a predictive value of attribute data of a processing target point; decoding encoded data to calculate a prediction residual that is a difference value between the attribute data and the predictive value; and generating the attribute data by addition of the calculated prediction residual and the predictive value calculated based on the set reference relationship.

In the information processing device and method according to the one aspect of the present technology, for a point cloud representing a three-dimensional object as a set of points, a coordinate system for geometry data is transformed from a polar coordinate system to a Cartesian coordinate system; a reference relationship indicating a reference destination used to calculate a predictive value of attribute data of a processing target point is set by using the generated geometry data in the Cartesian coordinate system, a prediction residual is calculated that is a difference value between the attribute data of the processing target point and the predictive value calculated based on the set reference relationship, and the calculated prediction residual is encoded.

In the information processing device and method according to the other aspect of the present technology, for a point cloud representing a three-dimensional object as a set of points, a coordinate system for geometry data is transformed from a polar coordinate system to a Cartesian coordinate system, a reference relationship indicating a reference destination used to calculate a predictive value of attribute data of a processing target point is set by using the generated geometry data in the Cartesian coordinate system, encoded data is decoded to calculate a prediction residual that is a difference value between the attribute data and the predictive value, and the attribute data is generated by addition of the calculated prediction residual and the predictive value calculated based on the set reference relationship.

BRIEF DESCRIPTION OF DRAWINGS

FIG. 4 illustrates an example of a method of encoding attribute data.

FIG. 5 illustrates an example of coordinate transformation.

FIG. 7 illustrates an example of duplicate point processing.

FIG. 8 illustrates an example without wrap around.

FIG. 10 illustrates an example with wrap around.

DESCRIPTION OF EMBODIMENTS

Hereinafter, modes for carrying out the present disclosure (hereinafter referred as embodiments) will be described. The descriptions will be given in the following order.
1. Coordinate System Transformation
2. First Embodiment (Coding Device)
3. Second Embodiment (Decoding Device)
4. Supplements 1. Coordinate System Transformation Literatures and Others Supporting Technical Details and Terminology The scope disclosed in the present technology includes not only details described in embodiments but also details described in the following NPL known at the time of filing the application.
[NPL 1]
(see above)
[NPL 2]
(see above)

In other words, the details described in the above NPL, the details of other literatures referred to in the above NPL, and others are also grounds for determining support requirements.

<Point Cloud>

Hitherto, as 3D data, there has been a point cloud that represents a three-dimensional structure (an object having a three-dimensional shape) as a set of many points. Data of a point cloud (also referred to as point cloud data) includes position information (also referred to as a geometry) and attribute information (also referred to as an attribute) of each point. The attribute may include any type of information. For example, the attribute may include color information, reflectance information, normal information, and the like for each point. Thus, the point cloud has a relatively simple data structure and can represent any three-dimensional structure with sufficient accuracy by using a sufficiently large number of points.

<Predictive Geometry Coding>

Since the amount of such point cloud data is relatively large, the amount of data is generally reduced by encoding or the like to record or transmit the data. Various methods have been proposed for the encoding. For example, NPL 2 describes predictive geometry coding as a method of encoding geometry data.

In the predictive geometry coding, a difference (also called prediction residual) between the geometry data of each point and a predictive value of geometry data is calculated, and the prediction residual is encoded. The geometry data of other points are referred to in calculating the predictive value.

Figure 1:
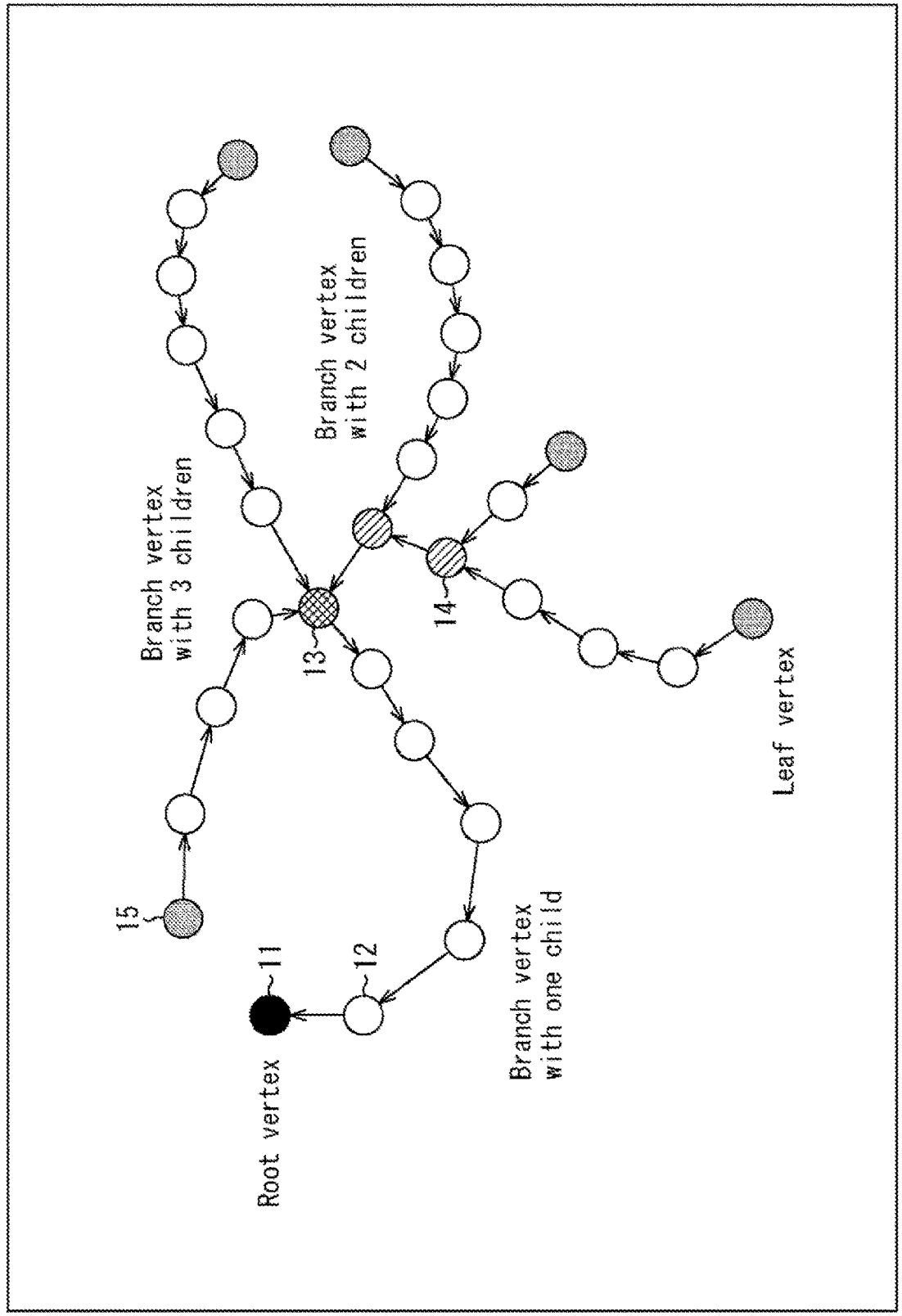
FIG. 1 is a diagram illustrating predictive geometry coding.

For example, as illustrated in FIG. 1, a reference structure (also called a prediction tree) is formed that indicates which point geometry data is to be referred to in calculating a predictive value of the geometry data of each point. In FIG. 1, circles indicate points and arrows indicate reference relationships. Any method of forming this reference structure may be used. For example, it is formed so that the geometry data of a nearby point is allowed to be referred to.

The prediction tree of the example in FIG. 1 is formed that has a point 11 not referring to the geometry data of any other point (Root vertex), a point 12 referred to by another point (Branch vertex with one child), a point 13 referred to by other three points (Branch vertex with 3 children), a point 14 referred to by other two points (Branch vertex with 2 children), and a point 15 not referred to by any other point (Leaf vertex).

Note that in FIG. 1, although only one point is labeled with 12, all the points indicated by white circles are points 12. Similarly, although only one point is labeled with 14, all the points indicated by hatched circles in FIG. 1 are points 14. Similarly, although only one point is labeled with 15, all points indicated by gray circles in FIG. 1 are points 15. Note that this prediction tree structure is an example, and the prediction tree is not limited to the example in FIG. 1. Therefore, any number of points 11 to 15 may be used. The pattern of the number of points to be referred to is also not limited to the example in FIG. 1. For example, points referred to by four or more points may be included.

A predictive value of the geometry data of each point is calculated based on such a reference structure (prediction tree). For example, predictive values are calculated by four methods (four modes), and the optimum predictive value is selected from among the predictive values.

Figure 2:
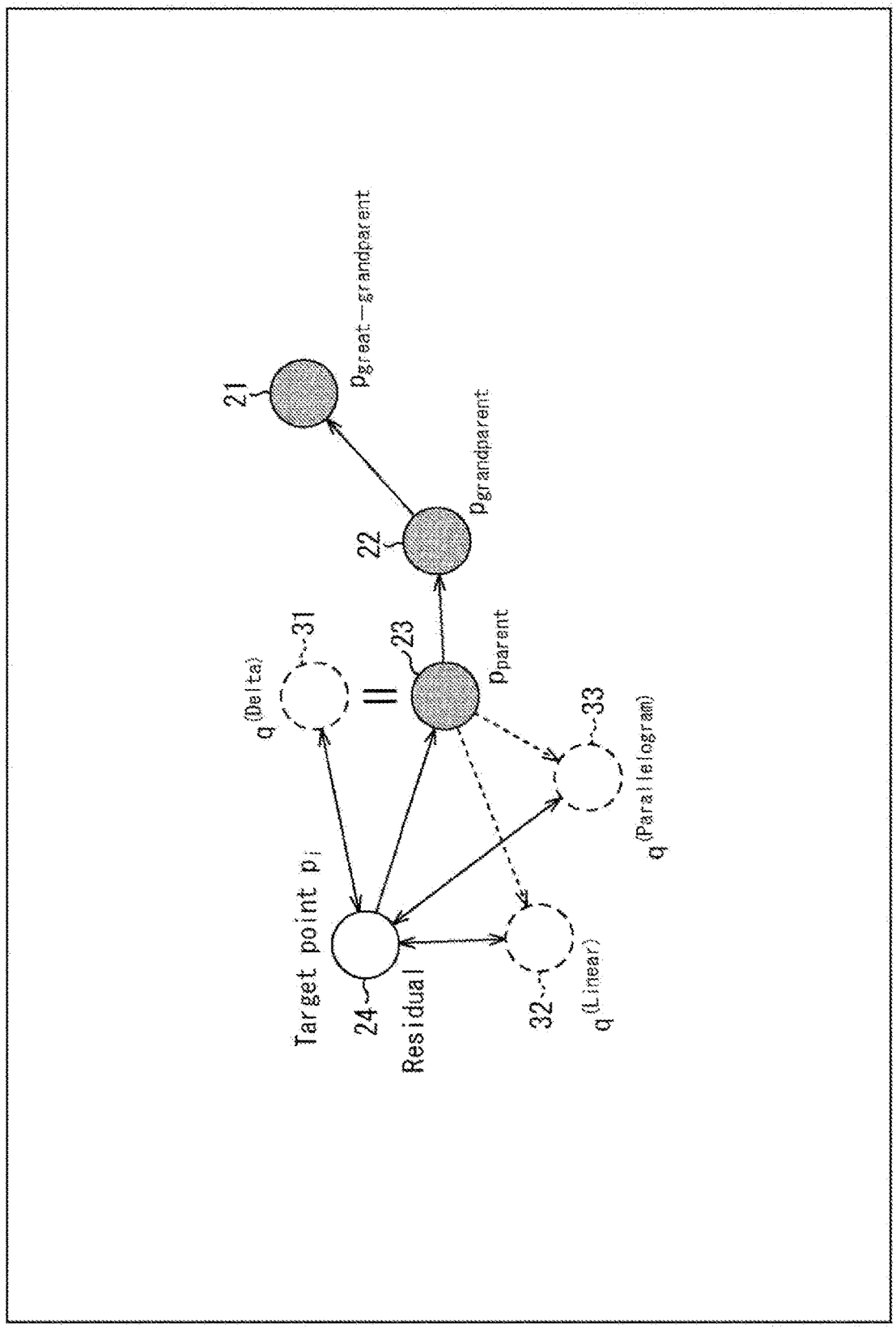
FIG. 2 is a diagram illustrating the predictive geometry coding.

For example, in a reference structure such as points 21 to 24 in FIG. 2, a case is assumed in which the point 24 is set as a processing target point (target point pi), and the predictive value of the geometry data of the point 24 is calculated. In a first mode, the point 23 ($P_{parent}$) to which the point 24 refers as the reference destination (also referred to as the parent node) in such a reference structure is a predicted point 31 of the point 24, and the geometry data of the predicted point 31 is a predictive value of the geometry data of the point 24. The geometry data of this predicted point 31 (that is, the predictive value of the geometry data of the point 24 in the first mode) is referred to as $q^{(Delta)}$.

In a second mode, it is assumed that in such a reference structure, the point 23 is the start point, the start point of the inverse vector of a reference vector (an arrow between the points 23 and 22) having as the end point the point 22 ($P_{grandparent}$), which is the parent node of the point 23, is the point 23, the end point of that inverse vector is a predicted point 32, and the geometry data of the predicted point 32 is a predictive value of the geometry data of the point 24. The geometry data of this predicted point 32 (that is, the predictive value of the geometry data of the point 24 in the second mode) is referred to as $q^{(Linear)}$.

In a third mode, it is assumed that in such a reference structure, the point 22 is the start point, the start point of the inverse vector of a reference vector (an arrow between the points 22 and 21) having as the end point the point 21 ($P_{great-grandparent}$), which is the parent node of the point 22, is the point 23, the end point of that inverse vector is a predicted point 33, and the geometry data of the predicted point 33 is a predictive value of the geometry data of the point 24. The geometry data of this predicted point 33 (that is, the predictive value of the geometry data of the point 24 in the third mode) is referred to as $q^{(Parallelogram)}$.

In a fourth mode, it is assumed that the point 24 is a root point (Root vertex) and the geometry data of other points are not referred to. In other words, for this point 24, the geometry data of the point 24 is encoded instead of the prediction residual. For the reference structure in the example of FIG. 2, the point 24 refers to the point 23, so that this mode is excluded.

Prediction residuals (differences from the geometry data of the point 24) are calculated for predictive values in the respective modes (three modes in the example of FIG. 2), and the minimum prediction residual is selected. In other words, the closest predicted point to the point 24 is selected, and the prediction residual corresponding to that the predicted point is selected.

By performing such processing for each point, prediction residuals of the points are calculated. The prediction residuals are then encoded. By doing so, an increase in encode amount can be suppressed.

<Polar Coordinate System>

Figure 3:
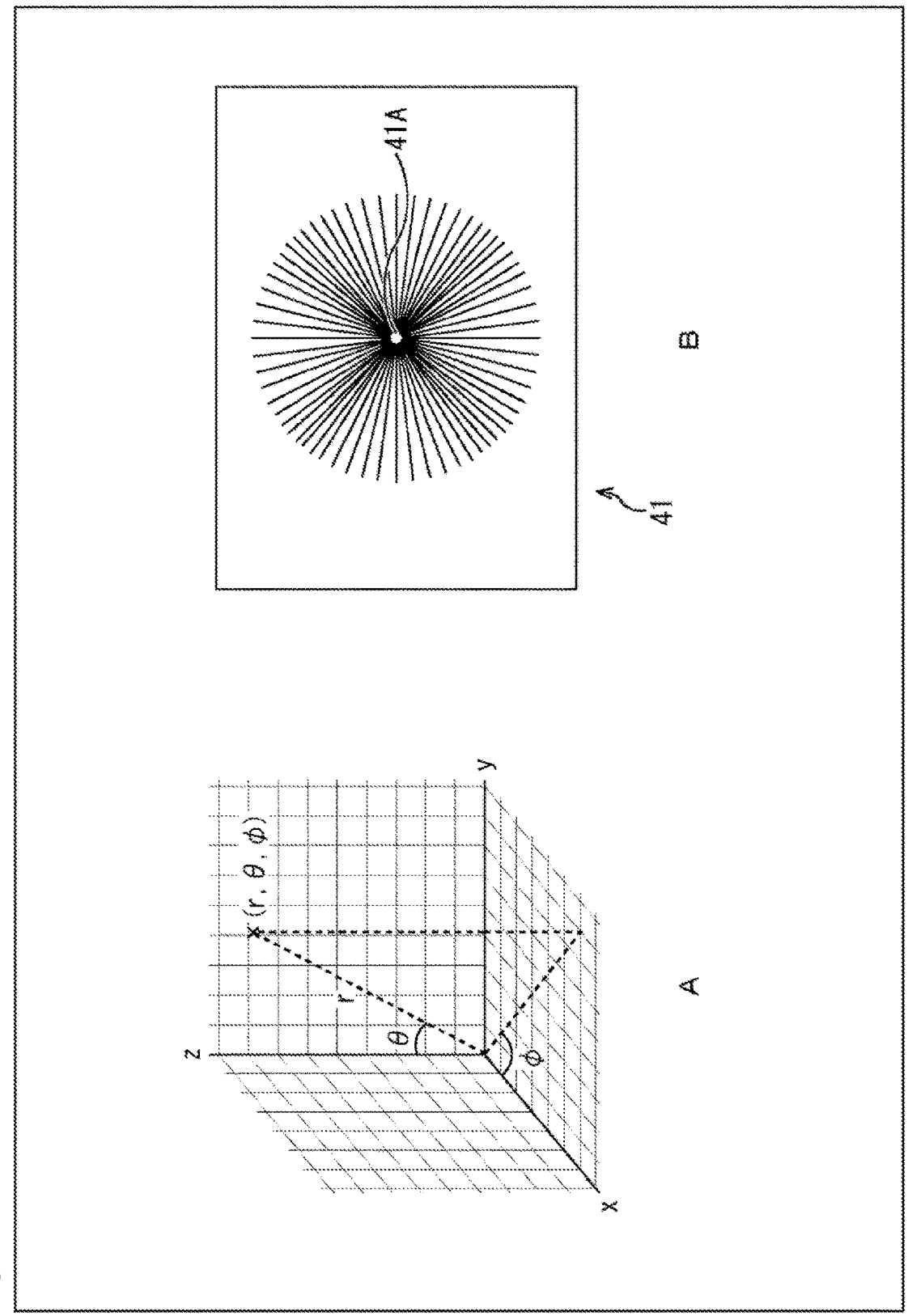
FIG. 3 illustrates LiDAR data.

In geometry data on a point cloud, the three-dimensional position of each point is generally represented in a Cartesian coordinate system (x, y, z), but the three-dimensional position of each point may be represented in, for example, a coordinate system using angle components, such as a polar coordinate system. In the case of the polar coordinate system, the three-dimensional position of a point is represented by a distance r from a reference point (origin), an angle φ in the horizontal direction (on the XY plane), and an angle θ with respect to the z-axis (the direction perpendicular to the XY plane), as illustrated in A of FIG. 3.

<LiDAR Data>

Incidentally, there is known LiDAR (Light Detection and Ranging, or Laser Imaging Detection and Ranging) data for analyzing the distance to a distant object and the properties of the object by emitting light and measuring the scattered light.

To generate LiDAR data, for example, linear scanning is performed while changing the angle θ in the polar coordinate system. Then, such scanning is repeated while changing φ in the polar coordinate system to scan the entire circumference. By performing scanning in such a procedure, LiDAR data 41 is generated that indicates the results of detecting objects around an observation point 41A, as illustrated in B of FIG. 3. In other words, this LiDAR data 41 is composed of a set of linear scan data. Specifically, as in the example of B in FIG. 3, a plurality of pieces of linear scan data are radially distributed around the observation point 41A.

For the geometry data with such a distribution, the use of the polar coordinate system improves the correlation between points more as compared to the Cartesian coordinate system, thereby improving the encoding efficiency.

<Coding of Attribute Data>

Incidentally, a method is conceivable in which the attribute data is encoded by referring to other data such as the geometry data described above to calculate a prediction residual. For the attribute data, the correlation between points tends to be higher as the distance between the points is shorter. In addition, since the attribute data has no position information, it does not change according to the coordinate system. In other words, the correlation of attribute data between points does not depend on the coordinate system, but depends on the distance between the points (the shorter the distance between the points, the higher the correlation).

In contrast, polar coordinates, when referring to their relationship, tends to be farther from each other than that in the Cartesian coordinate system due to the impact of the order of LiDAR scanning. Therefore, in the case where a predictive value is calculated for attribute data from peripheral points and the prediction residual is encoded, the encoding efficiency in the polar coordinate system may be reduced compared to that in the Cartesian coordinate system.

<Transformation to Cartesian Coordinate System>

Therefore, as illustrated in the top row of the table in FIG. 4, when the attribute data is encoded using the reference between points, the coordinate system for the geometry data used to form the reference relationship is set to a Cartesian coordinate system (Method 1). In other words, if the coordinate system for the geometry data is a polar coordinate system, it is transformed to a Cartesian coordinate system.

For example, an information processing method includes: transforming, for a point cloud representing a three-dimensional object as a set of points, a coordinate system for geometry data from a polar coordinate system to a Cartesian coordinate system; setting, by using the generated geometry data in the Cartesian coordinate system, a reference relationship indicating a reference destination used to calculate a predictive value of attribute data of a processing target point; calculating a prediction residual that is a difference value between the attribute data of the processing target point and the predictive value calculated based on the set reference relationship; and encoding the calculated prediction residual.

For example, an information processing device includes: a coordinate transformation unit that transforms, for a point cloud representing a three-dimensional object as a set of points, a coordinate system for geometry data from a polar coordinate system to an Cartesian coordinate system; a reference relationship setting unit that sets, by using the geometry data in the Cartesian coordinate system generated by the coordinate transformation unit, a reference relationship indicating a reference destination used to calculate a predictive value of attribute data of a processing target point; a prediction residual calculation unit that calculates a prediction residual that is a difference value between the attribute data of the processing target point and the predictive value calculated based on the reference relationship set by the reference relationship setting unit; and a prediction residual encoding unit that encodes the prediction residual calculated by the prediction residual calculation unit.

For example, an information processing method includes: transforming, for a point cloud representing a three-dimensional object as a set of points, a coordinate system for geometry data from a polar coordinate system to a Cartesian coordinate system; setting, by using the generated geometry data in the Cartesian coordinate system, a reference relationship indicating a reference destination used to calculate a predictive value of attribute data of a processing target point; decoding encoded data to calculate a prediction residual that is a difference value between the attribute data and the predictive value; and generating the attribute data by addition of the calculated prediction residual and the predictive value calculated based on the set reference relationship.

For example, an information processing device includes: a coordinate transformation unit that transforms, for a point cloud representing a three-dimensional object as a set of points, a coordinate system for geometry data from a polar coordinate system to a Cartesian coordinate system; a reference relationship setting unit that sets, by using the geometry data in the Cartesian coordinate system generated by the coordinate transformation unit, a reference relationship indicating a reference destination used to calculate a predictive value of attribute data of a processing target point; a prediction residual decoding unit that decodes encoded data to calculate a prediction residual that is a difference value between the attribute data and the predictive value; and an attribute data generation unit that generates the attribute data by addition of the prediction residual calculated by the prediction residual decoding unit and the predictive value calculated based on the reference relationship set by the reference relationship setting unit.

By doing so, a predictive value can be calculated by referring to a closer point than in the case of the polar coordinate system, so that a reduction in encoding efficiency of the attribute data can be suppressed.

Note that any encoding/decoding method may be used for the geometry data. In addition, any encoding/decoding method may be used for the attribute data as long as it refers to the attribute data of another point, calculates a prediction residual, and encodes/decodes the prediction residual.

<Formation of Reference Relationship>

As illustrated in the second row from the top of the table in FIG. 4, a reference relationship of the attribute data may be formed based on a distance in the Cartesian coordinate system (Method 1-1). For example, a reference relationship may be set based on a distance from the processing target point in the Cartesian coordinate system. By doing so, for example, a reference relationship can be set so as to refer to a closer point in distance, and a reduction in encoding efficiency can be further suppressed.

As illustrated in the third row from the top of the table in FIG. 4, a parent node and a grandparent node of the attribute data may be set from points whose geometry data have been decoded (Method 1-2). For example, a parent node and a grandparent node may be selected from points that are to be decoded prior to the processing target point. Note that the decoded point as used herein refers to a point that is to be decoded prior to the processing target node in decoding. By doing so, the decoding of the attribute data can be started before all the geometry data are decoded. This makes it possible to decode the attribute data (in other words, the point cloud data) with a lower delay.

<Predictive Mode>

As illustrated in the fourth row from the top of the table in FIG. 4, the geometry data and the attribute data may be encoded/decoded in a predictive mode in which a prediction tree is formed (Method 1-3). In other words, the encoding/decoding method of geometry data may be in a predictive mode (predictive geometry coding). In addition, the encoding/decoding method of attribute data may be in a predictive mode (also referred to as predictive attribute encoding).

For example, the coordinate system of geometry data to be encoded in the predictive mode may be transformed from the polar coordinate system to the Cartesian coordinate system. Alternatively, the coordinate system of geometry data generated by decoding the encoded data of the geometry data encoded in the predictive mode may be transformed from the polar coordinate system to the Cartesian coordinate system.

By associating the encoding/decoding method of geometry data with the encoding/decoding method of attribute data, the attribute data corresponding to the decoded geometry data can be decoded before all the geometry data are decoded. Therefore, it is possible to decode the point cloud data with a lower delay.

<Parallelization>

In that case, as illustrated in the fifth row from the top of the table in FIG. 4, the geometry data and the attribute data may be encoded or decoded for each node in the reference structure (Method 1-3-1). For example, a reference relationship may be set a reference relationship for the attribute data corresponding to the processing target node for geometry encoding in a prediction tree in the predictive mode. Alternatively, a reference relationship may be set a reference relationship for the attribute data corresponding to the processing target node for geometry decoding in a prediction tree in the predictive mode.

For example, as illustrated in FIG. 5, in the case where geometry tree information has been encoded in encoding order, first, for the geometry data, the prediction mode, coefficient, and position of the processing target node are decoded. Then, if the geometry is in the polar coordinate system, it is transformed to a Cartesian coordinate system. After the transformation, the reference source is identified from the decoded point. For example, the closest point in Euclidean distance may be the parent node, and the second closest point in Euclidean distance may be the grandparent node. A parent node indicates a node to which the processing target node belongs in the reference structure (tree structure). A grandparent node indicates a parent node of a parent node. Then, for the attribute data, the prediction mode, coefficient, and attribute of the processing target node are decoded.

By doing so, the geometry data and the attribute data, which correspond to each other can be decoded with a lower delay. Thus, it is possible to decode the point cloud data with a lower delay. Further, the processing for geometry data and the processing for attribute data can be partly shared. This makes it possible to reduce the processing amount of encoding/decoding. Further, it is possible to perform the encoding/decoding at a higher speed. Moreover, it is possible to suppress an increase in the cost of the encoding/decoding. In addition, in the case where it is achieved by hardware, an increase in a circuit scale can be suppressed.

<Prediction Mode for Attribute Data>

As illustrated in the sixth row from the top of the table in FIG. 4, a prediction mode for attribute data may be set, and a predictive value of the attribute data may be calculated in the set prediction mode (Method 1-3-2). For example, a prediction mode may be set, a predictive value may be calculated according to the prediction mode, and a prediction residual may be calculated using the predictive value and the attribute data. For example, the prediction mode to be applied may be selected from a plurality of candidates prepared in advance. Alternatively, encoded data may be decoded to generate a prediction mode, a predictive value may be calculated using the prediction mode, and attribute data may be calculated using the predictive value and the prediction residual.

Figure 6:
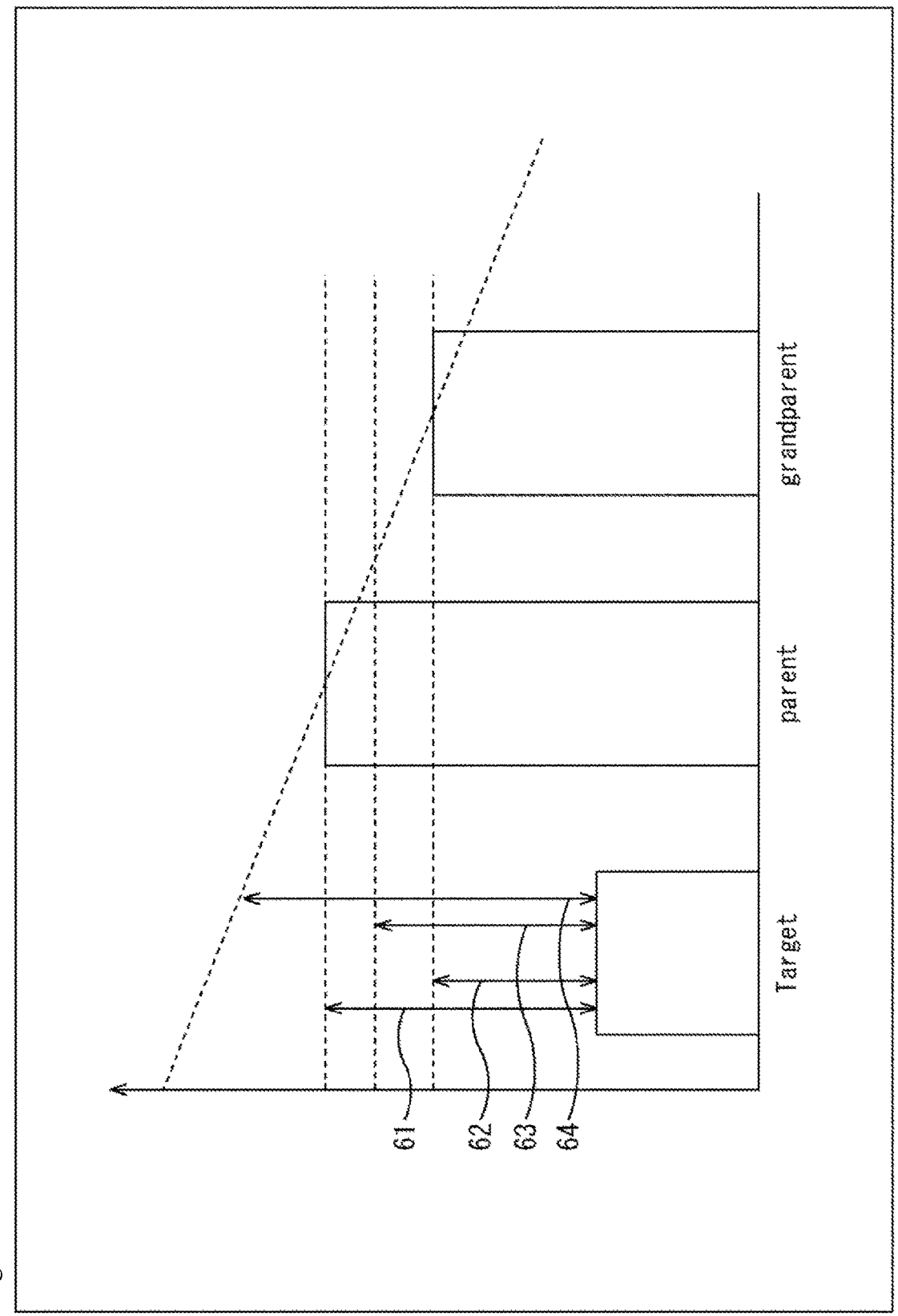
FIG. 6 illustrates an example of a prediction mode.

FIG. 6 is a bar graph showing the attribute data of the processing target node (Target), the attribute data of the parent node (parent), and the attribute data of the grandparent node (parent node of the parent node).

For example, the attribute data of the parent node may be used as the predictive value of the attribute data of the processing target node. Specifically, the difference between the attribute data of the parent node and the attribute data of the processing target node (a double-headed arrow 61 in FIG. 6) may be used as the prediction residual (hereinafter also referred to as a first prediction mode). The attribute data of the grandparent node may be used as the predictive value of the attribute data of the processing target node. Specifically, the difference between the attribute data of the grandparent node and the attribute data of the processing target node (a double-headed arrow 62 in FIG. 6) may be used as the prediction residual (hereinafter also referred to as a second prediction mode). The average of the attribute data of the parent node and the attribute data of the grandparent node may be used as the predictive value of the attribute data of the processing target node. Specifically, the difference between that average and the attribute data of the processing target node (a double-headed arrow 63 in FIG. 6) may be used as the prediction residual (hereinafter also referred to as a third prediction mode). The attribute data of the processing target node may be linearly predicted based on the attribute data of the parent node and the attribute data of the grandparent node. Specifically, the difference between the predictive value calculated by the linear prediction and the attribute data of the processing target node (a double-headed arrow 64 in FIG. 6) may be used as the prediction residual (hereinafter also referred to as a fourth prediction mode).

Of course, these are examples, and any other prediction modes may be used. For example, a prediction mode similar to that applied for geometry data may be used.

The prediction mode to be applied may be freely selected from among the above-described examples. For example, a predetermined prediction modes may be applied. The prediction mode applied for prediction of geometry data may also be applied for prediction of attribute data corresponding to that geometry data. In other words, the same prediction mode may be applied for both the geometry data and the attribute data of a point. In these cases, no signaling of the applied prediction mode is required for prediction of attribute data. In other words, there is no need to encode information indicating the applied prediction mode and provide that information to the decoding side by, for example, adding the information to the encoded data of the attribute data. Thus, a reduction in encoding efficiency can be suppressed.

For example, a plurality of candidates for prediction modes may be prepared, and a prediction mode to be applied may be selected from among the plurality of candidates. For example, the first to fourth prediction modes described above may be prepared as candidates, and one of them may be selected to be applied as the prediction mode for the attribute data. For example, the optimum prediction mode may be selected using cost calculation or the like.

The attribute may include any type of information. For example, color, reflectance, normal vector, and timestamp, may be included. Therefore, the tendency of the prediction accuracy of attribute depends on the information included in the attribute. In other words, which prediction mode is most suitable for improving the encoding efficiency depends on the properties of the information included in the attribute.

Therefore, preparing a plurality of candidates as described above makes it possible to apply a more appropriate prediction mode regardless of the information included in the attribute. Note that in the case of this example, the signaling of the applied prediction mode is required. In other words, in this case, information indicating the applied prediction mode is encoded and provided to the decoding side in a manner that the information is added to the encoded data of the attribute data, for example.

Note that in the case of this example, any number of candidates may be used as long as they are two or more candidates. The number of candidates may be variable depending on the situation.

Note that in any example, for the attribute data including a plurality of types of information (for the attribute data composed of a plurality of elements), a prediction mode may be set for each piece of information (each element). In other words, the prediction modes for all information (elements) may not be the same.

By doing so, a predictive value can be calculated by more variety of calculation methods. As a result, a predictive value can be calculated by a method according to the properties of the attribute data. Accordingly, a reduction in encoding efficiency can be suppressed.

<Duplicate Points>

As illustrated in the seventh row from the top of the table in FIG. 4, the attribute data of duplicate points whose geometries match each other may be sorted and then processed (Method 1-3-3).

For example, for a plurality of pieces of attribute data whose corresponding geometries are the same, the plurality of pieces of attribute data may be sorted according to the magnitude of their values, and a difference value between consecutive pieces of attribute data in the sort order may be calculated.

In a point cloud, a plurality of points may have the same geometry values and different attribute values. In other words, there may be a plurality of points with different attribute values at the same position. Such points are also referred to as duplicate points.

For geometry data of duplicate points, only the geometry data of one point is encoded. Then, the number of duplicates is encoded. As a result, on the decoding side, the geometry data is duplicated by the number of duplicates. As described above, the attribute can vary from point to point. Therefore, residuals in attribute data between duplicate points may be calculated, and the residuals may be encoded.

For example, assume that there are five duplicate points Idx0 to Idx4 as in the table illustrated in A of FIG. 7. In this case, the difference between the attributes of Idx0 and Idx1, the difference of the attributes of Idx1 and Idx2, the difference of the attributes of Idx2 and Idx3, and the difference of the attributes of Idx3 and Idx4 may be calculated and encoded.

As in the table illustrated in B of FIG. 7, the duplicate points may be sorted in descending order of attribute value, and then their differences may be calculated. By doing so, each difference value becomes "1", and the sum of the absolute values of the difference values in the case of A in FIG. 7, which is "15", is reduced to "5" in the case of B in FIG. 7. Thus, for the attribute data of duplicate points, an increase in encode amount can be suppressed. Accordingly, a reduction in encoding efficiency can be suppressed.

<Wrap Around>

As illustrated at the bottom of the table in FIG. 4, wrap around may be applied (Method 1-3-4). For example, wrap around may be applied to calculate a prediction residual. Alternatively, wrap around may be applied to generate attribute data.

For example, for attribute data of unsigned N bits, the residual of the attribute data is signed and up to (N+1) bits. Accordingly, the bit length may increase. In contrast, rather than encoding the residual directly, encoding the wrapped-around value allows the bit length of the residual to be up to N bits.

For example, for attribute data of unsigned 8 bits, when encoded without wrap around applied, the residual will be in the range of [−255, 255] as illustrated in FIG. 8. In other words, 9 bits are required to represent the residual (the bit length of the residual is 9 bits).

Figure 9:
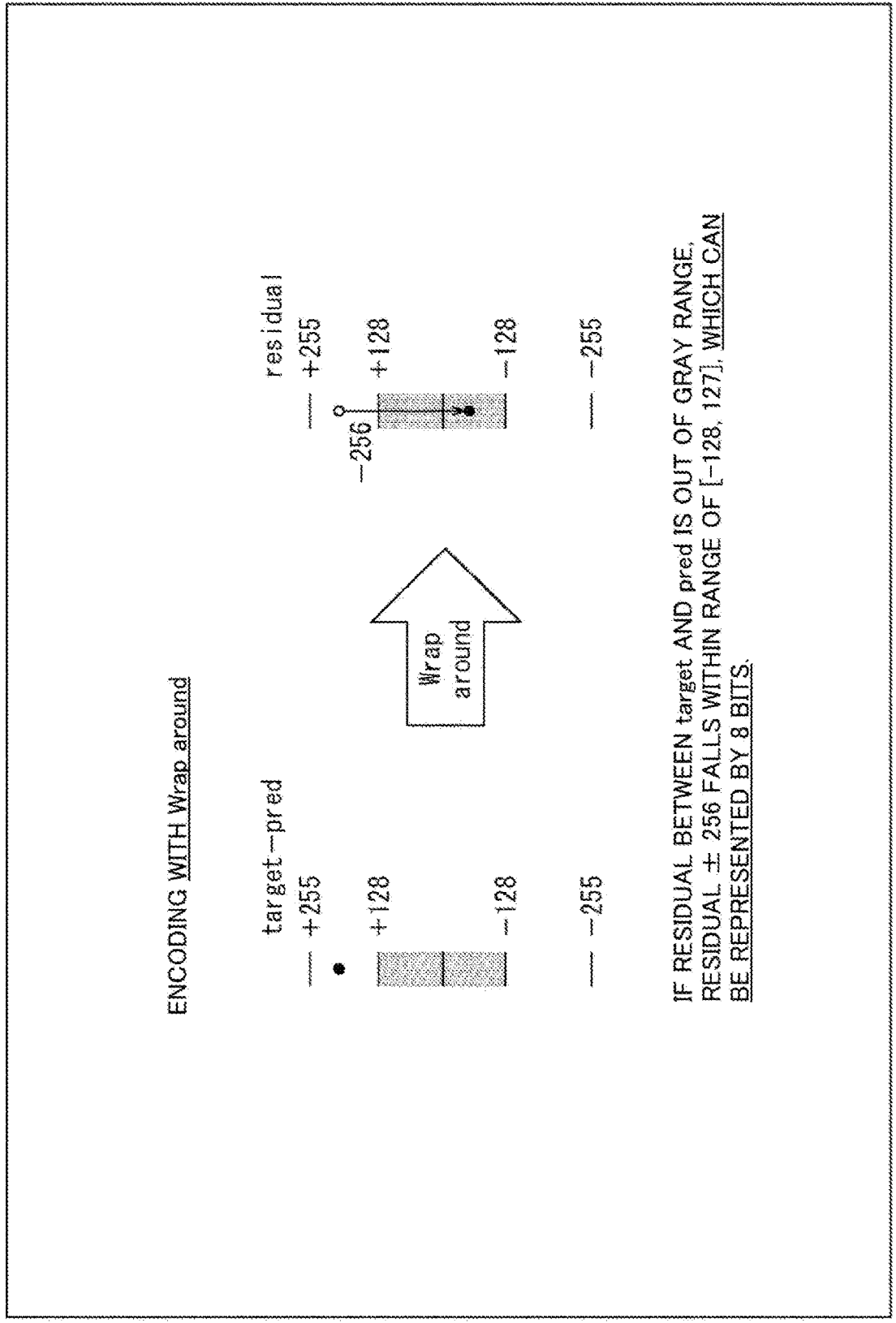
FIG. 9 illustrates an example with wrap around.

In contrast, as illustrated in FIG. 9, when wrap around is applied and then the residual is encoded, if the residual between the attribute to be processed and the predictive value is out of the gray range, ±256 is added to or subtracted from the value of the residual. Accordingly, the residual falls within the range of [−128, 127]. In other words, the residual can be represented by 8 bits.

More specifically, when wrap around is applied, an operation (processing for encoding) illustrated in a square on the left side of FIG. 10 is performed in encoding of residual. Therefore, when the residual is out of the range of −128 to 127, 256 is added to or subtracted from the residual to bring it back within that range (wrap around).

In contrast, an operation (processing for decoding) illustrated in a square on the right side of FIG. 10 is performed in decoding. Therefore, when the reconstructed value is out of the range of 0 to 255, 256 is added to or subtracted from the reconstructed value to bring it back within that range (unwrap).

For example, for the predictive value, pred=200 and the attribute value of the processing target point, target=30, the residual, residual=−170. Wrap around performed on this residual gives residual=86.

For the residual, residual=86 and the predictive value, pred=200, the reconstructed value, recon=286. Unwrap performed on this reconstructed value gives the reconstructed value, recon=30. Accordingly, the attribute value, target=30 of the processing target point is reconstructed.

By doing so, an increase in encode amount of the prediction residual can be suppressed. Accordingly, a reduction in encoding efficiency can be suppressed.

2. First Embodiment

<Encoding Device>

Figure 11:
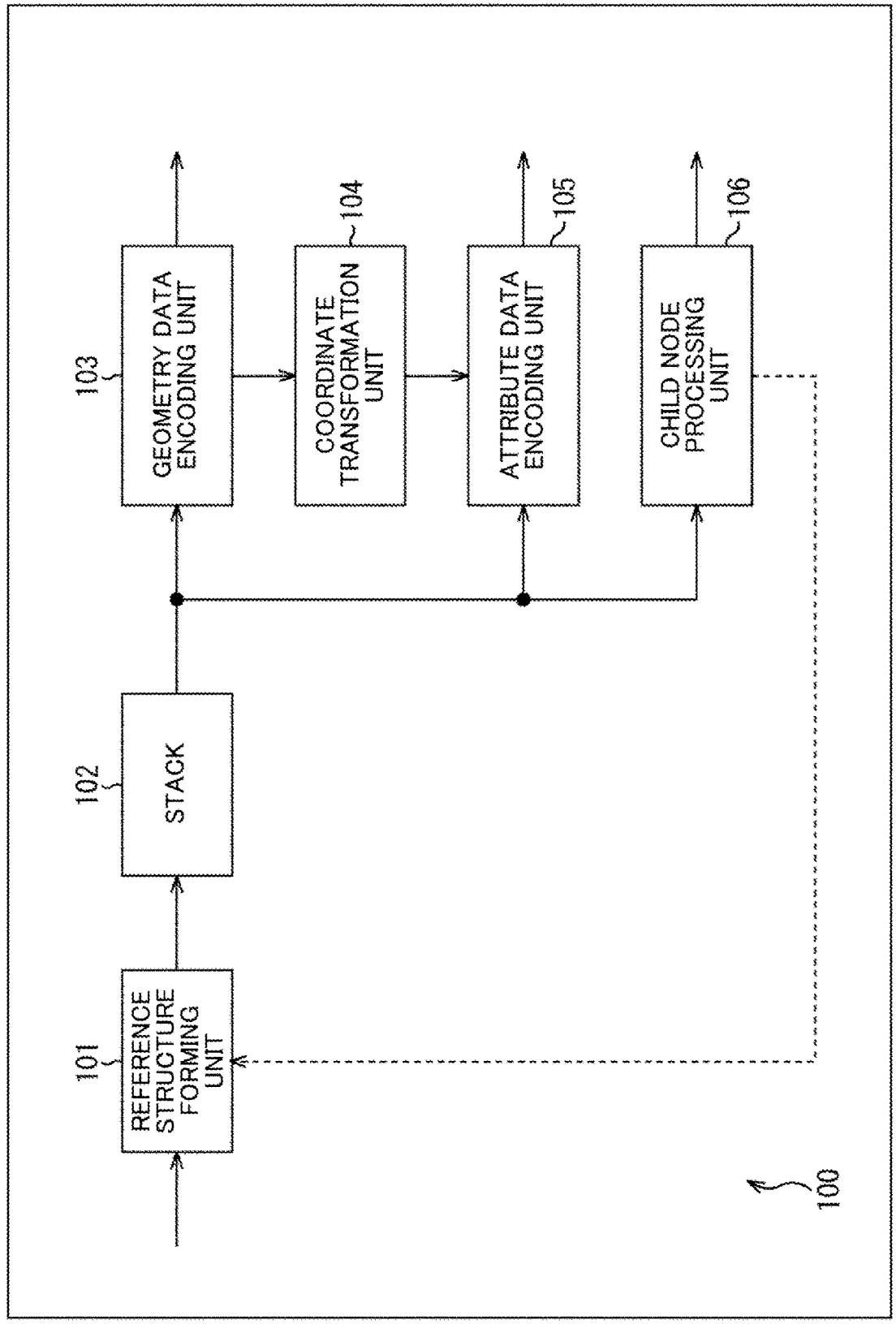
FIG. 11 is a block diagram illustrating a main configuration example of an encoding device.

FIG. 11 is a block diagram illustrating an example of a configuration of an encoding device that is an aspect of an information processing device to which the present technology is applied. The encoding device 100 illustrated in FIG. 11 is a device that encodes a point cloud (3D data). To the encoding device 100, the present technology (for example, the various methods described with reference to FIGS. 1 to 10) can be applied.

Meanwhile, FIG. 11 illustrates major components such as processing units and data flows, but processing units and data flows are not limited to those illustrated in FIG. 11. In other words, processing units that are not illustrated in FIG. 11 as blocks and processing and data flows that are not illustrated in FIG. 11 as arrows and the like may be present in the encoding device 100.

As illustrated in FIG. 11, the encoding device 100 includes a reference structure forming unit 101, a stack 102, a geometry data encoding unit 103, a coordinate transformation unit 104, an attribute data encoding unit 105, and a child node processing unit 106.

The reference structure forming unit 101 generates a reference structure (prediction tree) for encoding a point cloud for the supplied geometry data. The reference structure forming unit 101 supplies the geometry data and attribute data of the processing target point (the processing target node in the prediction tree) to the stack 102 according to the formed reference structure.

The stack 102 holds information on a last-in, first-out basis. For example, the stack 102 holds the geometry data, attribute data, and others of each point supplied from the reference structure forming unit 101. The stack 102 also supplies the piece of information held last among the held pieces of information to the subsequent processing unit. For example, the stack 102 supplies the geometry data of the last held point to the geometry data encoding unit 103 as the geometry data of the processing target point. The stack 102 also supplies the attribute data of the last held point to the attribute data encoding unit 105 as the attribute data of the processing target point. Furthermore, the stack 102 supplies the child node information of the last held point (the processing target point) to the child node processing unit 106. The child node information is information on other nodes (also referred to as child nodes) belonging to the processing target node in the tree structure.

The geometry data encoding unit 103 acquires the geometry data of the processing target point supplied from the stack 102. The geometry data encoding unit 103 encodes the geometry data to generate encoded data. For example, the geometry data encoding unit 103 may encode the geometry data in the predictive mode.

The geometry data encoding unit 103 outputs the generated encoded data to the outside of the encoding device 100 as encoded data of the geometry data. This encoded data of the geometry data is transmitted to any other device such as a decoding side device, for example, via a transmission line. The encoded data of the geometry data is also written and stored in, for example, any storage medium. The geometry data encoding unit 103 also supplies the geometry data of the processing target point to the coordinate transformation unit 104.

The coordinate transformation unit 104 acquires the geometry data of the processing target point supplied from the geometry data encoding unit 103. As described above in <Transformation to Cartesian Coordinate System>, if the coordinate system of the geometry data is a polar coordinate system, the coordinate transformation unit 104 transforms the coordinate system for the geometry data from the polar coordinate system to a Cartesian coordinate system. In other words, the coordinate transformation unit 104 uses the geometry data in the polar coordinate system to generate geometry data in a Cartesian coordinate system. The coordinate transformation unit 104 supplies the generated geometry data in the Cartesian coordinate system to the attribute data encoding unit 105.

The attribute data encoding unit 105 acquires the attribute data of the processing target point supplied from the stack 102. The attribute data encoding unit 105 acquires the geometry data in the Cartesian coordinate system supplied from the coordinate transformation unit 104. The attribute data encoding unit 105 encodes the acquired attribute data to generate encoded data. In addition, the attribute data encoding unit 105 constructs a reference relationship using the geometry data in the Cartesian coordinate system acquired from the coordinate transformation unit 104, and calculates a predictive value of the attribute data. The attribute data encoding unit 105 then calculates a prediction residual by using the predictive value and encodes the prediction residual. In other words, the attribute data encoding unit 105 encodes the attribute data by using the geometry data to generate encoded data.

The attribute data encoding unit 105 outputs the generated encoded data to the outside of the encoding device 100 as encoded data of the attribute data of the processing target point. This encoded data of the attribute data is transmitted to any other device such as a decoding side device, for example, via a transmission line. The encoded data of the attribute data is also written and stored in, for example, any storage medium.

The child node processing unit 106 acquires the child node information of the processing target point supplied from the stack 102. The child node processing unit 106 encodes the acquired child node information to generate encoded data. The child node processing unit 106 outputs the generated encoded data to the outside of the encoding device 100 as encoded data of the child node information of the processing target point. This encoded data of the child node information is transmitted to any other device such as a decoding side device, for example, via a transmission line.

The encoded data of the child node information is also written and stored in, for example, any storage medium.

Further, when encoding the child node of the processing target node, the child node processing unit 106 controls the reference structure forming unit 101 to supply the geometry data, attribute data, child node information, and the like of the child node to the stack 102 which in turn holds them.

In the encoding device 100 as described above, the geometry data encoding unit 103, the coordinate transformation unit 104, and the attribute data encoding unit 105, to which the present technology described above in <1. Coordinate System Transformation> is applied, can execute their processing.

For example, when the coordinate transformation unit 104 transforms the geometry data in the polar coordinate system to geometry data in a Cartesian coordinate system, the attribute data encoding unit 105 can encode the attribute data by using the reference relationship set based on the geometry data in the Cartesian coordinate system. Therefore, the attribute data encoding unit 105 can refer to a closer point than that in the case of setting a reference relationship based on the geometry data in the polar coordinate system. Therefore, the attribute data encoding unit 105 can improve the prediction accuracy compared to the case of setting a reference relationship based on the geometry data in the polar coordinate system. Therefore, a reduction in encoding efficiency of the attribute data can be suppressed.

These processing units (the reference structure forming unit 101 to the child node processing unit 106) have any configurations. For example, each processing unit may be configured of a logic circuit that implements the above-described processing. Further, each processing unit may include, for example, a central processing unit (CPU), a read only memory (ROM), and a random access memory (RAM), and execute a program using these to implement the above-described processing. Of course, each processing unit may have both the configurations, and some of the above-described processing may be implemented by a logical circuit and the other processing may be implemented by a program being executed. The processing units may have independent configurations, for example, some processing units may implement some of the above-described processing according to a logic circuit, some other processing units may execute a program to implement the above-described processing, and even some other processing units may implement the above-described processing according to both a logic circuit and a program being executed.

<Geometry Data Encoding Unit>

Figure 12:
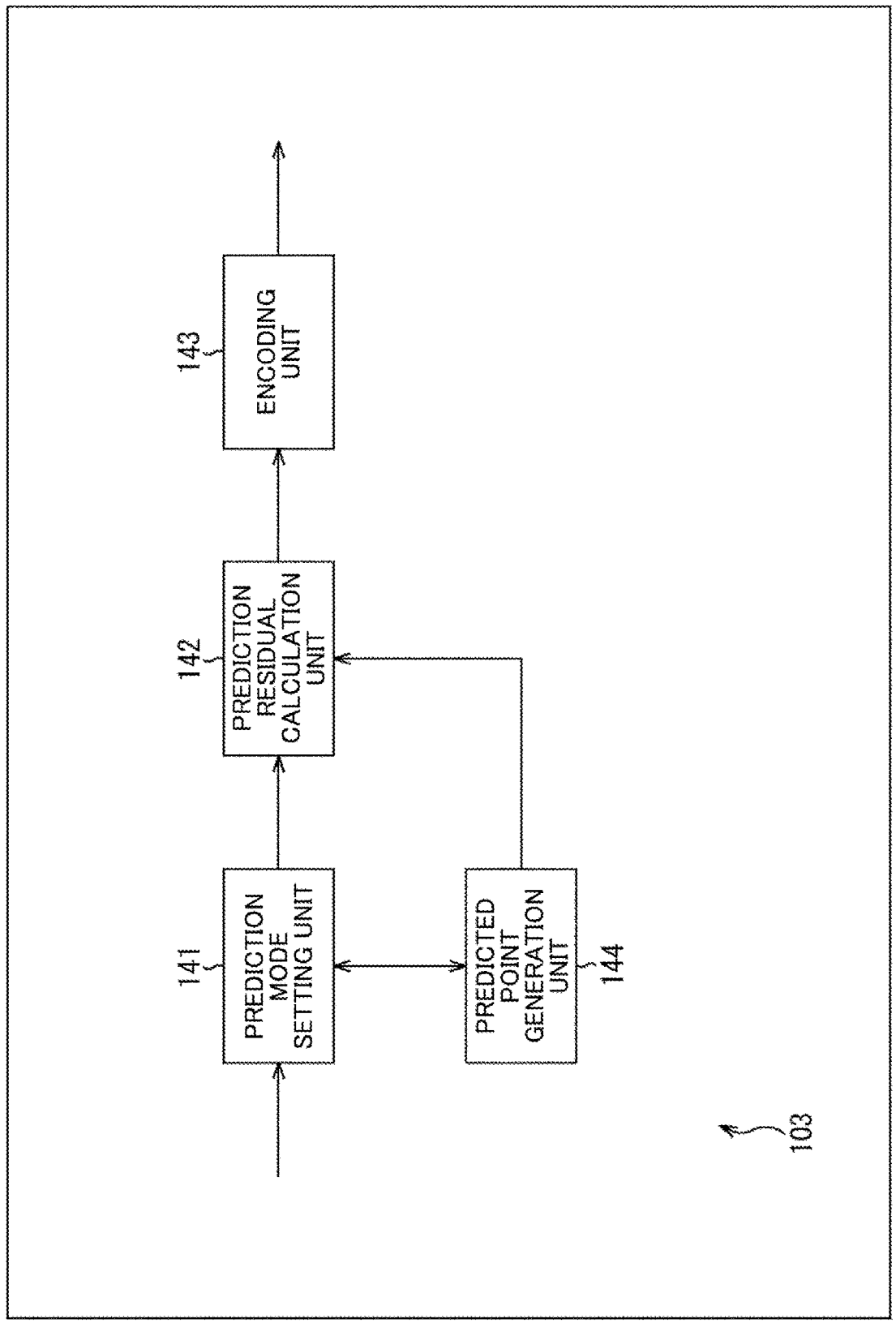
FIG. 12 is a block diagram illustrating a main configuration example of a geometry data encoding unit.

FIG. 12 is a block diagram illustrating a main configuration example of the geometry data encoding unit 103. Meanwhile, FIG. 12 illustrates major components such as processing units and data flows, but processing units and data flows are not limited to those illustrated in FIG. 12. In other words, processing units that are not illustrated in FIG. 12 as blocks and processing and data flows that are not illustrated in FIG. 12 as arrows and the like may be present in the geometry data encoding unit 103.

As illustrated in FIG. 12, the geometry data encoding unit 103 includes a prediction mode setting unit 141, a prediction residual calculation unit 142, an encoding unit 143, and a predicted point generation unit 144.

The prediction mode setting unit 141 acquires the geometry data of the processing target point supplied from the stack 102. The prediction mode setting unit 141 sets a prediction mode by using that geometry data. The prediction mode setting unit 141 supplies the geometry data and information indicating the set prediction mode to the prediction residual calculation unit 142. The prediction mode setting unit 141 also acquires the predicted point generated by the predicted point generation unit 144.

The prediction residual calculation unit 142 acquires the geometry data and the information indicating a prediction mode, which are supplied from the prediction mode setting unit 141. The prediction residual calculation unit 142 also acquires the predicted point generated by the predicted point generation unit 144. The prediction residual calculation unit 142 calculates a predictive value of the geometry data of the processing target point in the prediction mode set by the prediction mode setting unit 141, and calculates a prediction residual by using the geometry data of the processing target point and the predictive value. The prediction residual calculation unit 142 supplies the calculated prediction residual to the encoding unit 143.

The encoding unit 143 acquires the prediction residual of the processing target point supplied from the prediction residual calculation unit 142. The encoding unit 143 encodes the prediction residual to generate encoded data. The encoding unit 143 outputs the generated encoded data as encoded data of the geometry data (encoded data of the prediction residual of geometry).

The predicted point generation unit 144 acquires the information indicating the prediction mode set by the prediction mode setting unit 141, and generates a predicted point based on that information (that is, in the set prediction mode). The predicted point generation unit 144 supplies the generated predicted point to the prediction mode setting unit 141 and the prediction residual calculation unit 142.

The geometry data encoding unit 103 has the configuration described above, encodes each node according to the prediction tree, and executes encoding of the geometry data in the predictive mode.

<Attribute Data Encoding Unit>

Figure 13:
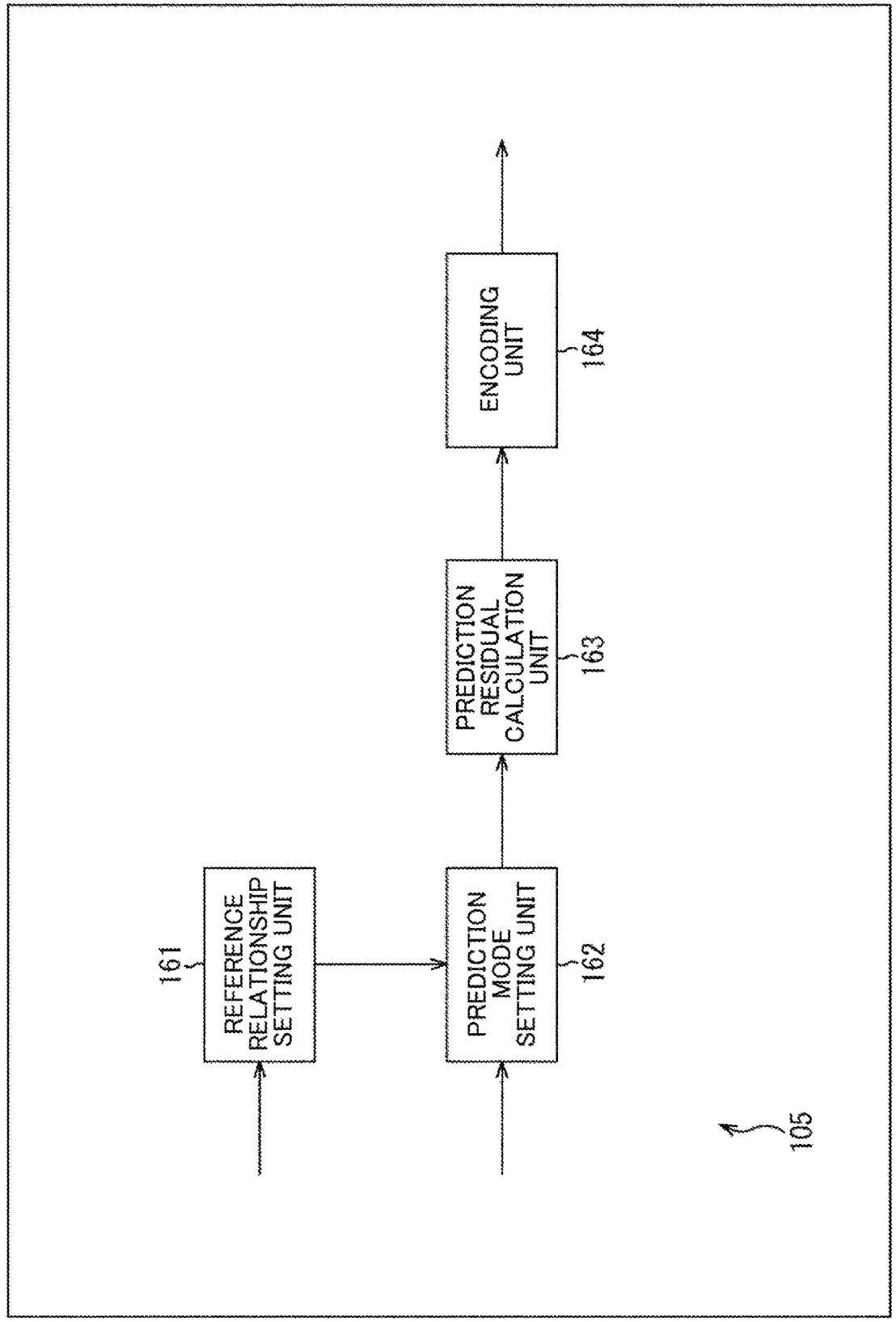
FIG. 13 is a block diagram illustrating a main configuration example of an attribute data encoding unit.

FIG. 13 is a block diagram illustrating a main configuration example of the attribute data encoding unit 105. Meanwhile, FIG. 13 illustrates major components such as processing units and data flows, but processing units and data flows are not limited to those illustrated in FIG. 13. In other words, processing units that are not illustrated in FIG. 13 as blocks and processing and data flows that are not illustrated in FIG. 13 as arrows and the like may be present in the attribute data encoding unit 105.

As illustrated in FIG. 13, the attribute data encoding unit 105 includes a reference relationship setting unit 161, a prediction mode setting unit 162, a prediction residual calculation unit 163, and an encoding unit 164.

The reference relationship setting unit 161 acquires the geometry data in the Cartesian coordinate system supplied from the coordinate transformation unit 104. The reference relationship setting unit 161 sets a reference relationship indicating a reference destination used to calculate a predictive value of the attribute data of the processing target point based on the geometry data in the Cartesian coordinate system.

For example, the reference relationship setting unit 161 may set a reference relationship based on a distance from the processing target point in the Cartesian coordinate system. The reference relationship setting unit 161 may also set a parent node or a grandparent node of the processing target point (processing target node). Further, the reference relationship setting unit 161 may select a parent node and a grandparent node from among the points that are to be decoded prior to the processing target point during decoding.

Furthermore, the reference relationship setting unit 161 may set a reference relationship for the attribute data corresponding to the processing target node of the geometry data encoding unit 103 in the prediction tree in the predictive mode. The reference relationship setting unit 161 supplies information indicating the set reference relationship to the prediction mode setting unit 162.

The prediction mode setting unit 162 acquires the attribute data of the processing target point supplied from the stack 102. The prediction mode setting unit 162 also acquires the information indicating the reference relationship from the reference relationship setting unit 161. The prediction mode setting unit 162 sets a prediction mode in which a predictive value is calculated based on that information. Meanwhile, the prediction mode setting unit 162 may select a prediction mode to be applied from among a plurality of candidates prepared in advance. The prediction mode setting unit 162 is not limited to this, and can set a prediction mode, to which variations as described above in <Prediction Mode for Attribute Data> are applied. The prediction mode setting unit 162 supplies information indicating the set prediction mode and the attribute data to the prediction residual calculation unit 163.

The prediction residual calculation unit 163 acquires the information indicating the prediction mode and the attribute data, which are supplied from the prediction mode setting unit 162. The prediction residual calculation unit 163 uses them to calculate a predictive value of the processing target point. The prediction residual calculation unit 163 calculates a prediction residual by using the calculated predictive value and the attribute data of the processing target point. Specifically, the prediction residual calculation unit 163 calculates a prediction residual that is a difference value between the attribute data of the processing target point and the predictive value calculated based on the reference relationship set by the reference relationship setting unit 161.

In calculating this prediction residual, for a plurality of pieces of attribute data whose corresponding geometries are the same, the prediction residual calculation unit 163 may sort the plurality of pieces of attribute data according to the magnitude of their values, and calculate difference values between consecutive pieces of attribute data in the sort order. For example, as described with reference to FIG. 7, the prediction residual calculation unit 163 sorts a plurality of pieces of attribute data whose corresponding geometries are the same in descending order of their values. Then, the prediction residual calculation unit 163 calculates the first difference value by subtracting the predictive value (for example, "0") from the top piece of attribute data in the sort order. Next, the prediction residual calculation unit 163 calculates the second difference value by subtracting the top piece of attribute data from the second piece of attribute data in the sort order. In other words, the top piece of attribute data (the piece of attribute data to be processed immediately before) is used as a predictive value. Subsequently, in the same way, the prediction residual calculation unit 163 calculates each difference value by repeatedly subtracting one of two pieces of attribute data that are consecutive in the sort order from the other. As will be described later, the difference value thus calculated is supplied to the encoding unit 164 as a prediction residual and is encoded. By doing so, a reduction in encoding efficiency can be suppressed as described above in <Duplicate Point>.

When calculating the prediction residual, the prediction residual calculation unit 163 may apply wrap around to calculate the prediction residual. By doing so, a reduction in encoding efficiency can be suppressed as described above in <Wrap Around>.

The prediction residual calculation unit 163 supplies the calculated prediction residual to the encoding unit 164.

The encoding unit 164 acquires the prediction residual supplied from the prediction residual calculation unit 163. The encoding unit 164 encodes the prediction residual to generate encoded data. The encoding unit 164 outputs the generated encoded data as encoded data of the attribute data of the processing target point.

By doing so, the encoding unit 164 encodes the prediction residual calculated using the predictive value calculated based on the geometry data in the Cartesian coordinate system. Thus, the encoding unit 164 can suppress a reduction in encoding efficiency more as compared to the case of encoding the prediction residual calculated using the predictive value calculated based on the geometry data in the polar coordinate system.

<Flow of Encoding Processing>

Next, processing performed by the encoding device 100 will be described. The encoding device 100 encodes data of a point cloud by executing encoding processing. An example of a flow of this encoding processing will be described with reference to the flowchart of FIG. 14.

When the encoding processing is started, the reference structure forming unit 101 of the encoding device 100 executes reference structure forming processing to form a reference structure (prediction tree) of geometry data in step S101.

In step S102, the reference structure forming unit 101 stores in the stack 102 the geometry data and the like of the top node of the reference structure formed in step S101.

In step S103, the geometry data encoding unit 103 acquires the geometry data of the last stored point (node) from the stack 102. The attribute data encoding unit 105 acquires the attribute data of that point. The child node processing unit 106 acquires child node information of that point.

In step S104, the geometry data encoding unit 103 executes geometry data encoding processing to encode the geometry data.

In step S105, the coordinate transformation unit 104 determines whether the geometry data is in a polar coordinate system. If it is determined that the geometry data is in a polar coordinate system, the processing proceeds to step S106.

In step S106, the coordinate transformation unit 104 performs coordinate transformation to transform the coordinate system for the geometry data from the polar coordinate system to a Cartesian coordinate system. When the processing of step S106 ends, the processing proceeds to step S107. If it is determined in step S105 that the coordinate system of the geometry data is not a polar coordinate system (it is a Cartesian coordinate system), the processing of step S106 is skipped (bypassed) and then the processing proceeds to step S107.

In step S107, the attribute data encoding unit 105 executes attribute data encoding processing to encode the attribute data.

In step S108, the child node processing unit 106 encodes the child node information.

In step S109, the child node processing unit 106 determines whether to encode the child node of the processing target point. If the processing target point is not a leaf node of the tree structure but has a child node and it is determined that the child node is also to be encoded, the processing proceeds to step S110.

In step S110, the child node processing unit 106 controls the reference structure forming unit 101 to supply the child node information (geometry data, attribute data, child node information, etc.) to the stack 102 which in turn holds them. When the processing of step S110 ends, the processing proceeds to step S111. If it is determined in step S109 that any child node is not to be encoded because, for example, there is no child node of the processing target point (for example, the processing target point is a leaf node of the tree structure), the processing of S110 is skipped (bypassed) and then the processing proceeds to step S111.

In step S111, the geometry data encoding unit 103 determines whether the stack 102 is empty. If it is determined that the stack 102 is not empty (that is, information of at least one point is stored), the processing returns to step S103. Thus, the processing from step S103 to step S111 is executed with the point stored last in the stack 102 as the processing target point.

While such processing is repeated, if it is determined in step S111 that the stack is empty, the encoding processing ends.

<Flow of Geometry Encoding Processing>

Next, an example of the flow of the geometry data encoding processing executed in step S104 of FIG. 14 will be described with reference to the flowchart of FIG. 15.

When the geometry data encoding processing is started, the prediction mode setting unit 141 sets a prediction mode for the geometry data in step S141.

In step S142, the prediction residual calculation unit 142 calculates a prediction residual of the geometry data.

In step S143, the encoding unit 143 encodes prediction mode information indicating the prediction mode of the geometry data set in step S141.

In step S144, the encoding unit 143 encodes the prediction residual of the geometry data calculated in step S142.

In step S145, the predicted point generation unit 144 calculates and adds a predicted point.

Figure 14:
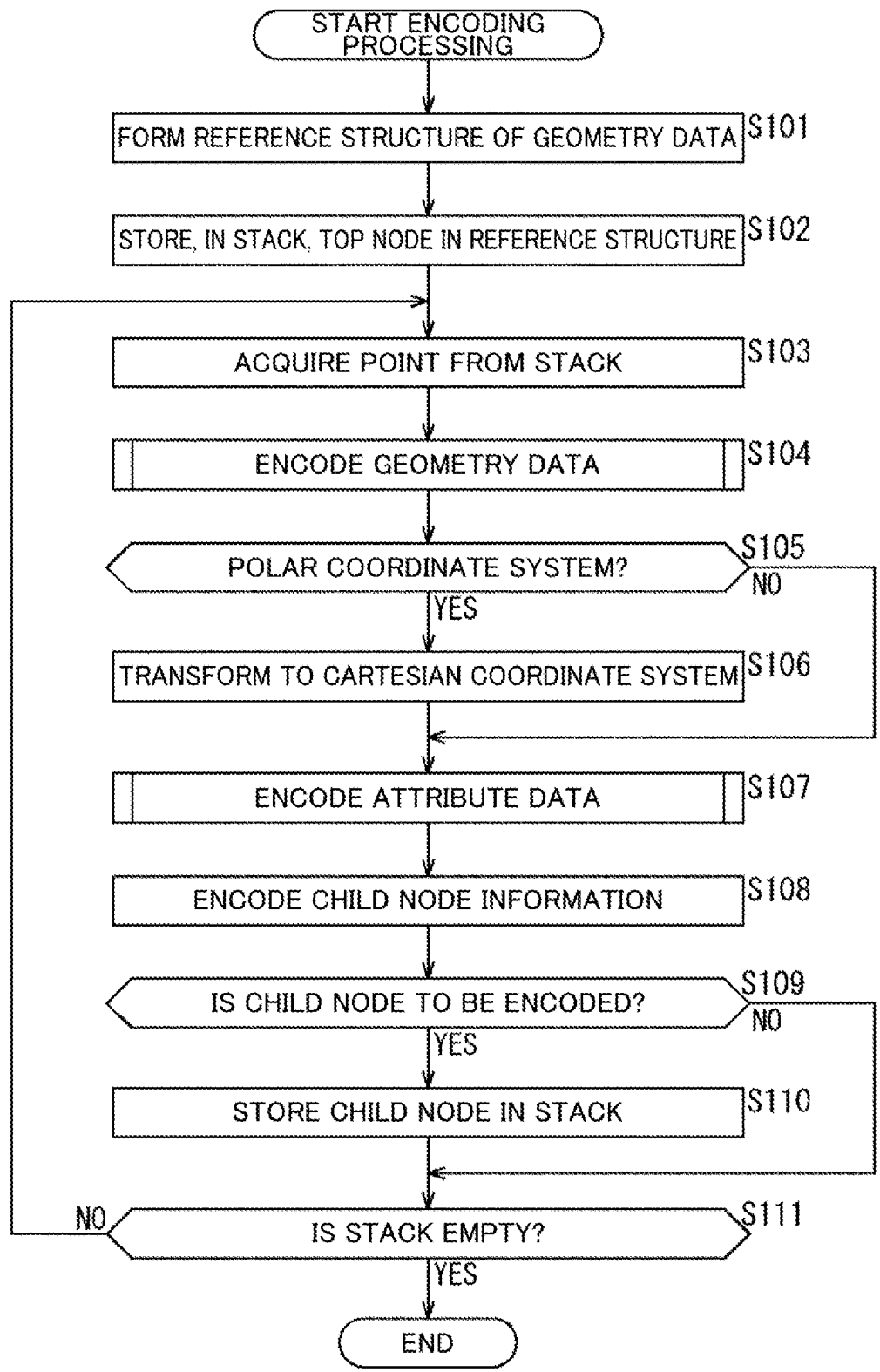
FIG. 14 is a flowchart illustrating an example of a flow of encoding processing.
Figure 15:
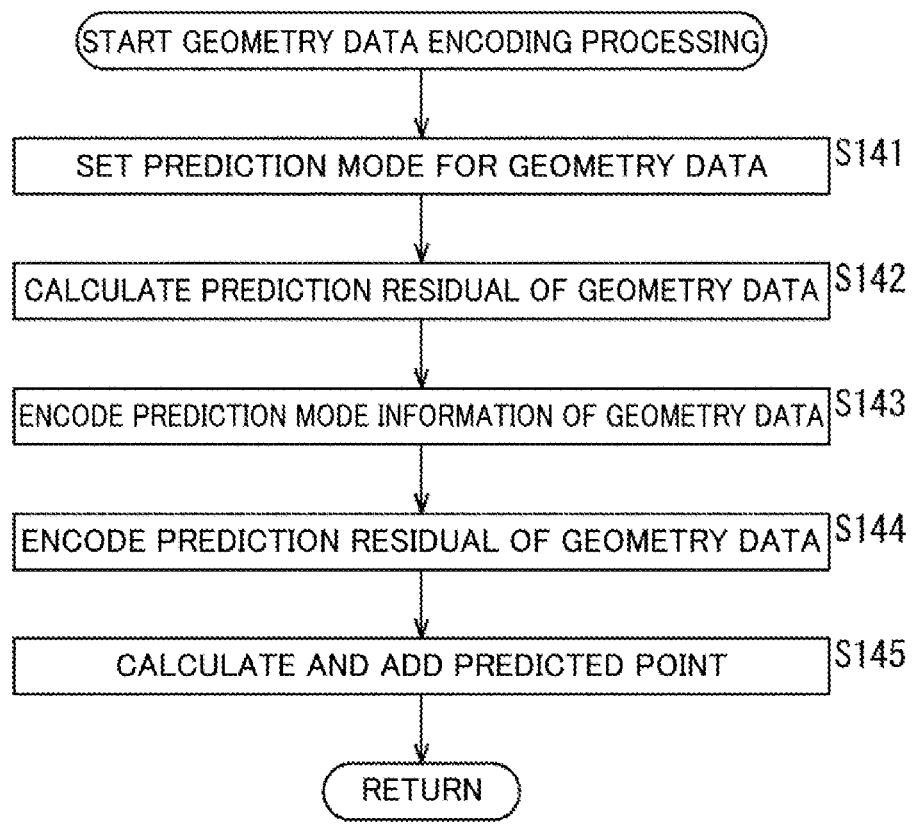
FIG. 15 is a flowchart illustrating an example of a flow of geometry data encoding processing.
Figure 16:
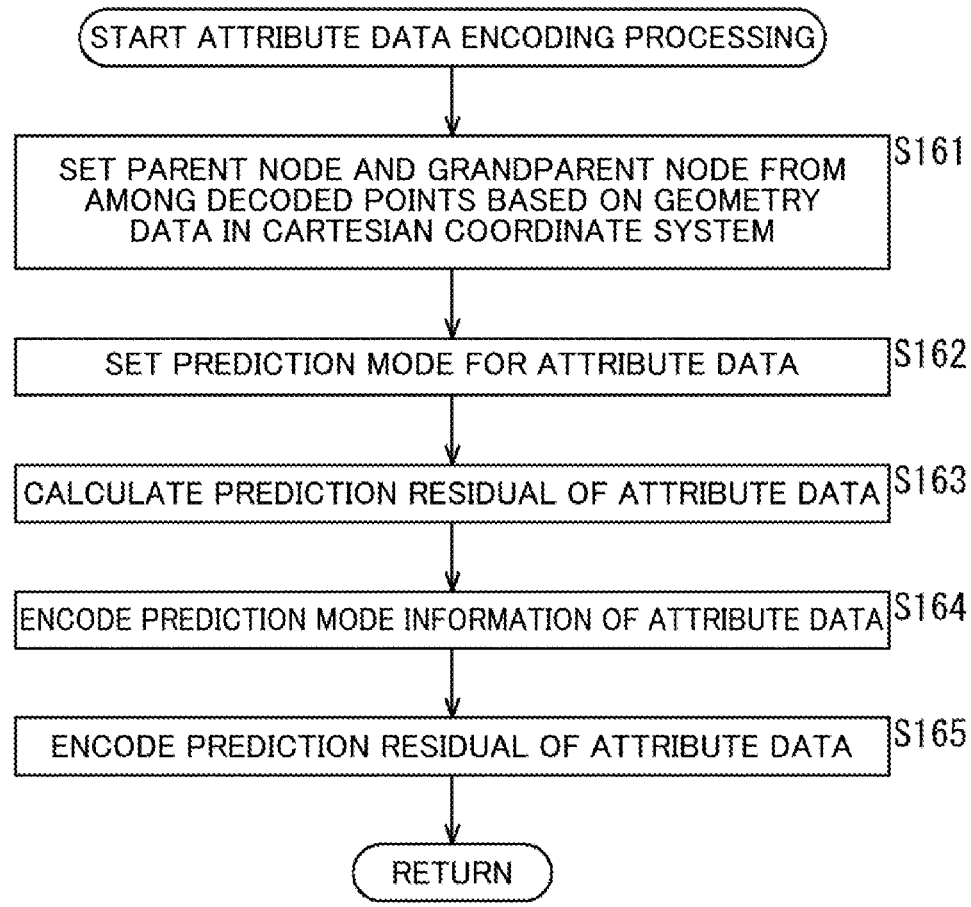
FIG. 16 is a flowchart illustrating an example of a flow of attribute data encoding processing.

When the processing of step S145 ends, the geometry data encoding processing ends and then the processing returns to FIG. 14.

<Flow of Attribute Data Encoding Processing>

Next, an example of the flow of the attribute data encoding processing executed in step S107 of FIG. 14 will be described with reference to the flowchart of FIG. 15.

When the attribute data encoding processing is started, in step S161, the reference relationship setting unit 161 sets a parent node and a grandparent node from among the decoded points based on the geometry data in the Cartesian coordinate system.

In step S162, the prediction mode setting unit 162 sets a prediction mode for the attribute data.

In step S163, the prediction residual calculation unit 163 calculates a predictive value of the attribute data of the processing target point in the prediction mode set in step S162. Then, the prediction residual calculation unit 163 calculates a prediction residual of the attribute data of the processing target point by using the predictive value and the attribute data of the processing target point.

In step S164, the encoding unit 164 encodes prediction mode information indicating the prediction mode of the attribute data set in step S162.

In step S165, the encoding unit 164 encodes the prediction residual of the attribute data calculated in step S163.

When the processing of step S165 ends, the attribute data encoding processing ends and then the processing returns to FIG. 14.

Each processing executed as described above makes it possible to set a reference relationship of the attribute data based on the geometry data in the Cartesian coordinate

3. Second Embodiment

<Decemberoding Device>

Figure 17:
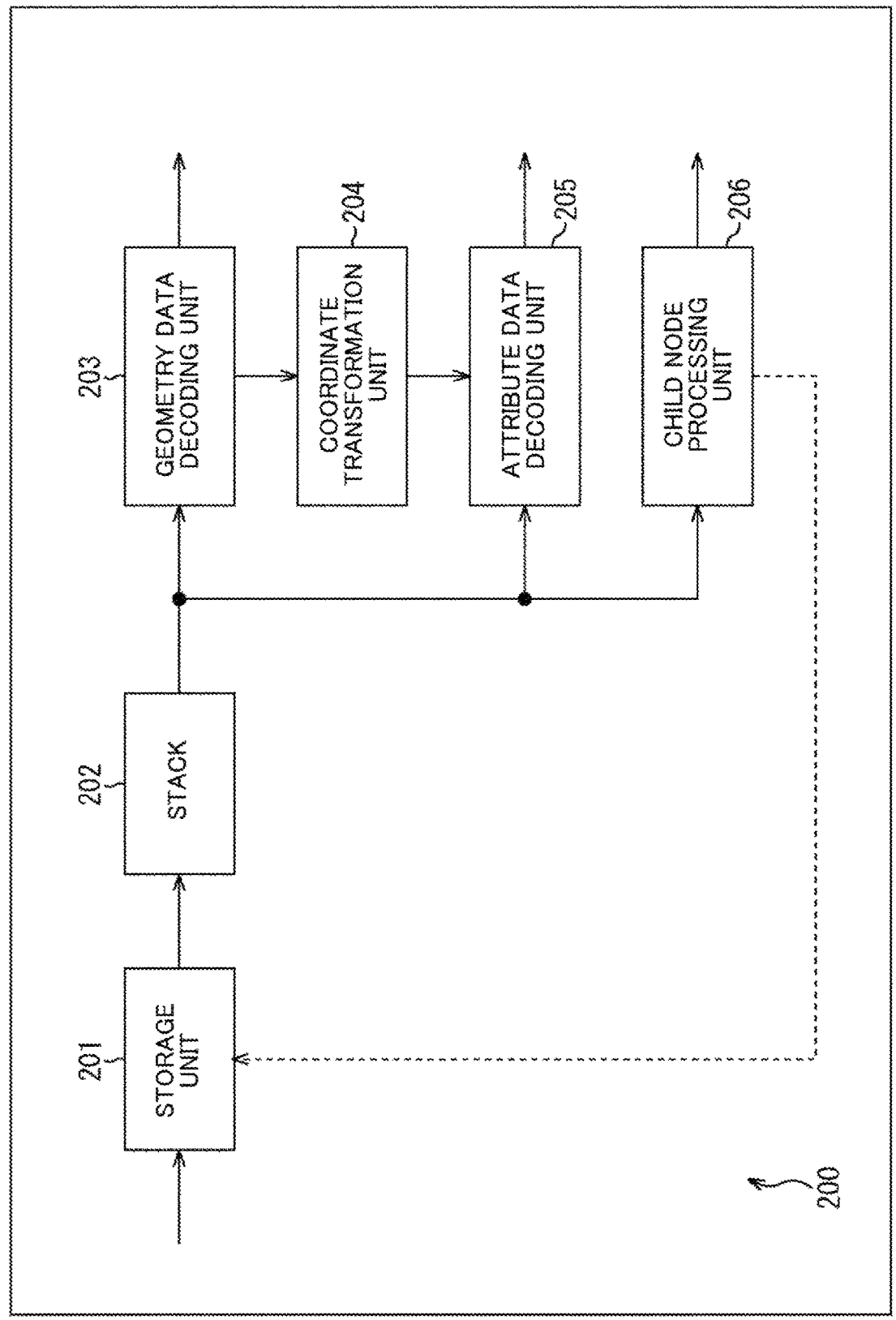
FIG. 17 is a block diagram illustrating a main configuration example of a decoding device.

FIG. 17 is a block diagram illustrating an example of a configuration of a decoding device that is one aspect of an information processing device to which the present technology is applied. The decoding device 200 illustrated in FIG. 17 is a device that decodes encoded data of a point cloud (3D data). The decoding device 200 decodes the encoded data of the point cloud generated by the encoding device 100, for example.

FIG. 17 shows principal components such as processing units and data flows, and FIG. 17 does not show all components. That is, processing units that are not illustrated in FIG. 17 as blocks and processing and data flows that are not illustrated in FIG. 17 as arrows and the like may be present in the decoding device 200.

As illustrated in FIG. 17, the decoding device 200 includes a storage unit 201, a stack 202, a geometry data decoding unit 203, a coordinate transformation unit 204, an attribute data decoding unit 205, and a child node processing unit 206.

The storage unit 201 stores encoded data to be supplied to the decoding device 200. The storage unit 201 also supplies, for each node (each point) of the reference structure, the encoded data to the stack 202 which in turn holds it.

The stack 202 holds information on a last-in, first-out basis. For example, the stack 202 holds encoded data of each point (each node) supplied from the storage unit 201. The stack 202 also supplies the geometry data of the last held point (node) and the like to the geometry data decoding unit 203. Further, the stack 202 supplies the attribute data of the last held point (node) and the like to the attribute data decoding unit 205. Furthermore, the stack 202 supplies the child node information of the last held point (node) and the like to the child node processing unit 206.

The geometry data decoding unit 203 acquires the encoded data of the geometry data of the point held last in the stack 202. The geometry data decoding unit 203 also decodes the acquired encoded data to generate the geometry data. For example, the geometry data decoding unit 203 may decode the encoded data of the geometry data encoded in the predictive mode. The geometry data decoding unit 203 outputs the generated geometry data to the outside of the decoding device 200. The geometry data decoding unit 203 also supplies the geometry data to the coordinate transformation unit 204.

The coordinate transformation unit 204 acquires the geometry data of the processing target point supplied from the geometry data decoding unit 203. As described above in <Transformation to Cartesian Coordinate System>, if the geometry data is in a polar coordinate system, the coordinate transformation unit 204 transforms the coordinate system for the geometry data from the polar coordinate system to a Cartesian coordinate system. In other words, the coordinate transformation unit 204 uses the geometry data in the polar coordinate system to generate geometry data in a Cartesian coordinate system. The coordinate transformation unit 204 supplies the generated geometry data in the Cartesian coordinate system to the attribute data decoding unit 205.

The attribute data decoding unit 205 acquires the encoded data of the attribute data of the processing target point supplied from the stack 202. The attribute data decoding unit 205 acquires the geometry data in the Cartesian coordinate system supplied from the coordinate transformation unit 204. The attribute data decoding unit 205 decodes the acquired encoded data to generate the attribute data. Meanwhile, the attribute data decoding unit 205 decodes the encoded data to generate the prediction residual of the attribute data. The attribute data decoding unit 205 also calculates a predictive value of the attribute data by using the geometry data in the Cartesian coordinate system. The attribute data decoding unit 205 then adds the predictive value to the prediction residual to generate attribute data for the processing target point. In other words, the attribute data decoding unit 205 decodes the encoded data by using the geometry data in the Cartesian coordinate system to generate the attribute data. The attribute data decoding unit 205 outputs the generated attribute data of the processing target point to the outside of the decoding device 200.

The child node processing unit 206 acquires the encoded data of the child node information of the processing target point supplied from the stack 202. The child node processing unit 206 decodes the acquired encoded data to generate the child node information of the processing target point. The child node processing unit 206 outputs the generated child node information to the outside of decoding device 200.

Further, when decoding the child node of the processing target node, the child node processing unit 206 controls the storage unit 201 to supply the geometry data, attribute data, child node information, and the like of the child node to the stack 202 which in turn holds them.

In the decoding device 200 as described above, the geometry data decoding unit 203, the coordinate transformation unit 204, and the attribute data decoding unit 205, to which the present technology described above in <1. Coordinate System Transformation> is applied, can execute their processing.

For example, when the coordinate transformation unit 204 transforms the geometry data in the polar coordinate system to geometry data in a Cartesian coordinate system, the attribute data decoding unit 205 can reconstruct (generate) the attribute data by using the reference relationship set based on the geometry data in the Cartesian coordinate system. Therefore, the attribute data decoding unit 205 can refer to a closer point than that in the case of setting a reference relationship based on the geometry data in the polar coordinate system. Therefore, the attribute data decoding unit 205 can improve the prediction accuracy compared to the case of setting a reference relationship based on the geometry data in the polar coordinate system. Therefore, a reduction in encoding efficiency of the attribute data can be suppressed.

These processing units (the storage unit 201 to the child node processing unit 206) have any configurations. For example, each processing unit may be configured of a logic circuit that implements the above-described processing. Further, each processing unit may include, for example, a CPU, a ROM, and a RAM, and execute a program using these to implement the above-described processing. Of course, each processing unit may have both the configurations, and some of the above-described processing may be implemented by a logical circuit and the other processing may be implemented by a program being executed. The processing units may have independent configurations, for example, some processing units may implement some of the above-described processing according to a logic circuit, some other processing units may execute a program to implement the above-described processing, and even some other processing units may implement the above-described processing according to both a logic circuit and a program being executed.

<Geometry Data Decoding Unit>

Figure 18:
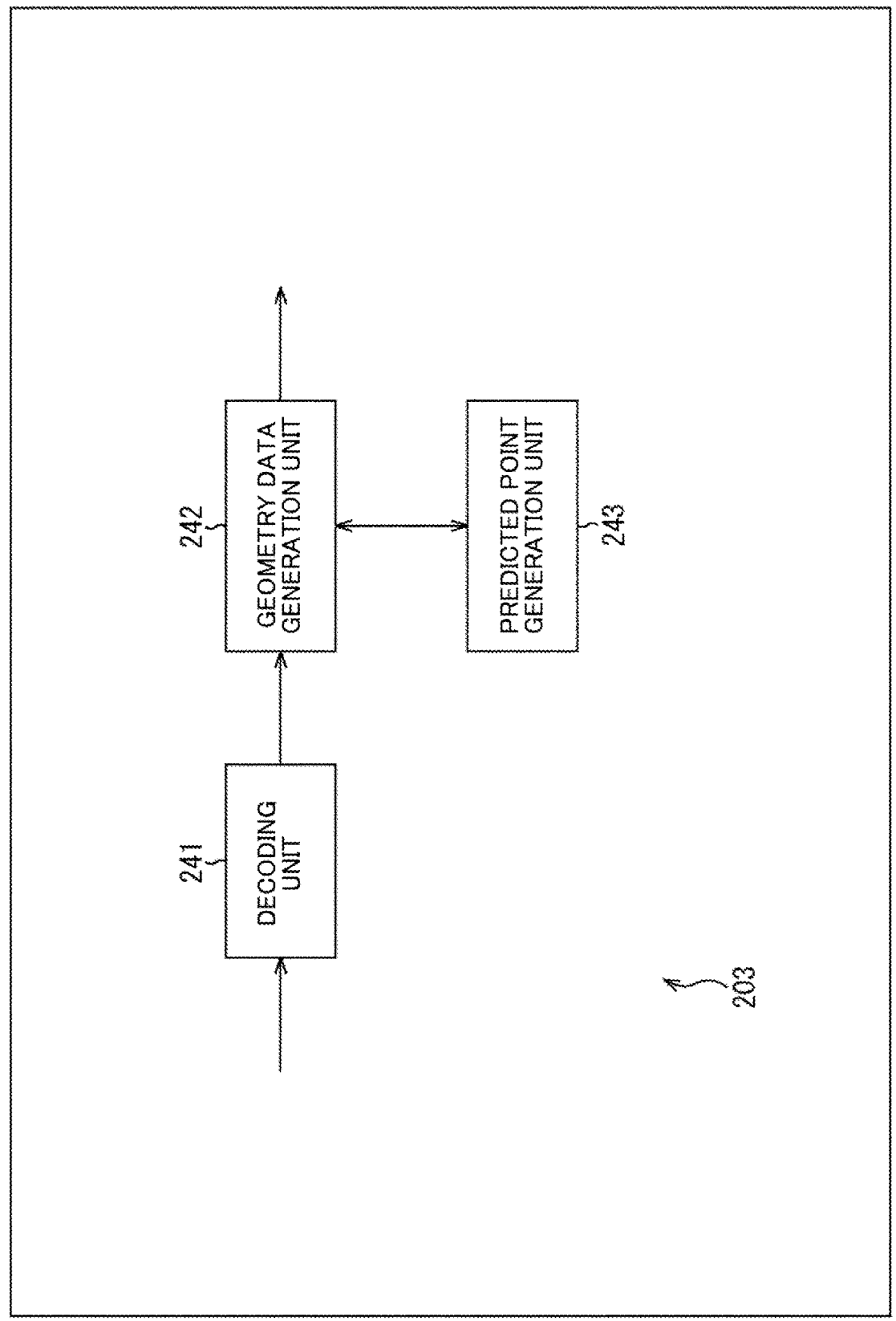
FIG. 18 is a block diagram illustrating a main configuration example of a geometry data decoding unit.

FIG. 18 is a block diagram illustrating a main configuration example of the geometry data decoding unit 203. Meanwhile, FIG. 18 illustrates major components such as processing units and data flows, but processing units and data flows are not limited to those illustrated in FIG. 18. In other words, processing units that are not illustrated in FIG. 18 as blocks and processing and data flows that are not illustrated in FIG. 18 as arrows and the like may be present in the geometry data decoding unit 203.

As illustrated in FIG. 18, the geometry data decoding unit 203 includes a decoding unit 241, a geometry data generation unit 242, and a predicted point generation unit 243.

The decoding unit 241 acquires the encoded data of the geometry data supplied from the stack 202. The decoding unit 241 decodes the encoded data to generate the prediction residual of the geometry data, prediction mode information, and the like. The decoding unit 241 supplies the prediction residual, prediction mode information, and the like to the geometry data generation unit 242.

The geometry data generation unit 242 acquires the prediction residual, prediction mode information, and the like supplied from the decoding unit 241. Based on the prediction mode information, the geometry data generation unit 242 performs prediction in the prediction mode applied during encoding, and calculates a predictive value of the processing target point. The geometry data generation unit 242 adds up the predictive value and the prediction residual to generate attribute data of the processing target point. The geometry data generation unit 242 outputs the generated attribute data to the outside of the decoding device 200. The geometry data generation unit 242 also acquires the predicted point generated by the predicted point generation unit 243.

The predicted point generation unit 243 generates a predicted point based on the prediction mode information (that is, in the prediction mode applied during encoding). The predicted point generation unit 243 supplies the generated predicted point to the geometry data generation unit 242.

The geometry data decoding unit 203 has the configuration described above, decodes the encoded data of each node according to the prediction tree, and executes decoding of the geometry data in the predictive mode.

<Attribute Data Decoding Unit>

Figure 19:
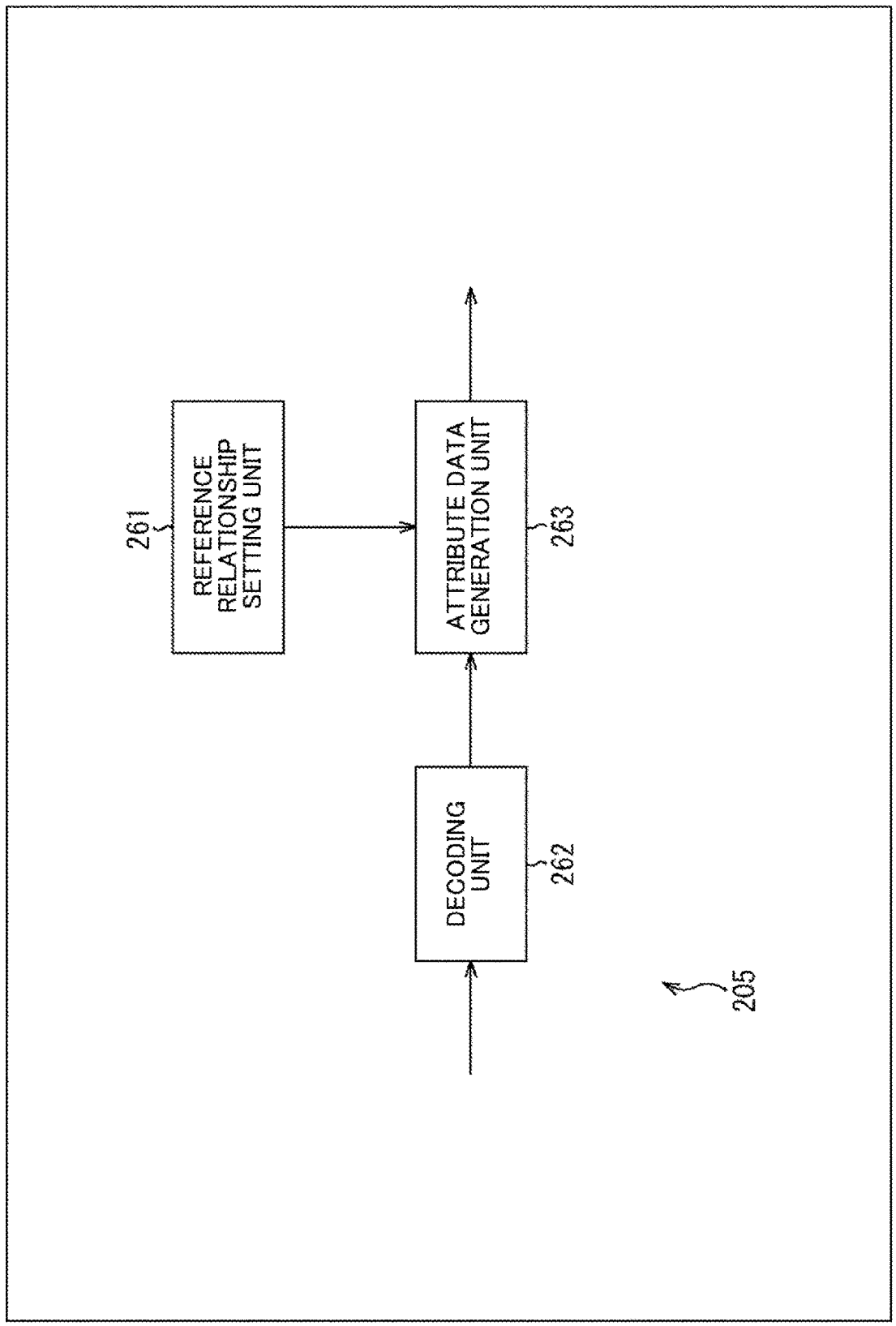
FIG. 19 is a block diagram illustrating a main configuration example of an attribute data decoding unit.

FIG. 19 is a block diagram illustrating a main configuration example of the attribute data decoding unit 205. Meanwhile, FIG. 19 illustrates major components such as processing units and data flows, but processing units and data flows are not limited to those illustrated in FIG. 19. In other words, processing units that are not illustrated in FIG. 19 as blocks and processing and data flows that are not illustrated in FIG. 19 as arrows and the like may be present in the attribute data decoding unit 205.

As illustrated in FIG. 19, the attribute data decoding unit 205 includes a reference relationship setting unit 261, a decoding unit 262, and an attribute data generation unit 263.

The reference relationship setting unit 261 acquires the geometry data in the Cartesian coordinate system supplied from the coordinate transformation unit 204. The reference relationship setting unit 261 sets a reference relationship indicating a reference destination used to calculate a predictive value of the attribute data of the processing target point based on the geometry data in the Cartesian coordinate system.

For example, the reference relationship setting unit 261 may set a reference relationship based on a distance from the processing target point in the Cartesian coordinate system. The reference relationship setting unit 261 may also set a parent node or a grandparent node of the processing target point (processing target node). Further, the reference relationship setting unit 261 may select a parent node and a grandparent node from among the points that are to be decoded prior to the processing target point. Furthermore, the reference relationship setting unit 261 may set a reference relationship for the attribute data corresponding to the processing target node of the geometry data decoding unit 203 in the prediction tree in the predictive mode. The reference relationship setting unit 261 supplies information indicating the set reference relationship to the attribute data generation unit 263.

The decoding unit 262 acquires the encoded data of the attribute data of the processing target point supplied from the stack 202. The decoding unit 262 also decodes the encoded data to generate the prediction residual of the attribute data. Further, the decoding unit 262 decodes the encoded data to generate the prediction mode information. The decoding unit 262 supplies the acquired prediction residual and prediction mode information to the attribute data generation unit 263.

The attribute data generation unit 263 acquires the information indicating a reference relationship (information indicating a parent node and a grandparent node) supplied from the reference relationship setting unit 261. The attribute data generation unit 263 acquires the prediction residual and prediction mode information supplied from the decoding unit 262. The attribute data generation unit 263 generates attribute data for the processing target point by using that information. For example, the attribute data generation unit 263 refers to the parent node and grandparent node set by the reference relationship setting unit 261 as appropriate, and calculates a predictive value of the attribute data of the processing target point in the prediction mode indicated by the prediction mode information. The attribute data generation unit 263 adds the predictive value to the prediction residual to generate attribute data for the processing target point.

In calculating this prediction residual, for a plurality of pieces of attribute data which is sorted in a predetermined sort order and whose corresponding geometries are the same, the attribute data generation unit 263 may generate each piece of attribute data by addition of a difference value between consecutive pieces of attribute data in the sort order. For example, assume that in encoding the attribute data, a plurality of pieces of attribute data whose corresponding geometries are the same are sorted in descending order of their values, difference values between consecutive pieces of attribute data in the sort order are calculated, and the difference values are encoded as prediction residuals. In that case, the attribute data generation unit 263 calculates the top piece of attribute data in the sort order by adding the first difference value (prediction residual) obtained by decoding the encoded data to the calculated predictive value (for example, "0"). In the same way, the attribute data generation unit 263 calculates the second piece of attribute data in the sort order by adding the next difference value (prediction residual) to the calculated piece of attribute data. In other words, the calculated top piece of attribute data (the piece of attribute data calculated immediately before) is used as a predictive value. In the same way, the attribute data generation unit 263 calculates each piece of attribute data by repeating the addition of the difference value (prediction residual) to the calculated piece of attribute data (predictive value). By doing so, a reduction in encoding efficiency can be suppressed as described above in <Duplicate Point>.

In generating attribute data, the attribute data generation unit 263 may apply wrap around. By doing so, a reduction in encoding efficiency can also be suppressed as described above in <Wrap Around>.

The attribute data generation unit 263 outputs the generated attribute data to the outside of the decoding device 200.

By doing so, the decoding unit 262 decodes the encoded data of the prediction residual calculated using the predictive value calculated based on the geometry data in the Cartesian coordinate system. Thus, the decoding unit 262 can suppress a reduction in encoding efficiency more as compared to the case of decoding the encoded data of the prediction residual calculated using the predictive value calculated based on the geometry data in the polar coordinate system.

<Flow of Decoding Processing>

Next, processing performed by the decoding device 200 will be described. The decoding device 200 decodes the encoded data of a point cloud by executing decoding processing. An example of the flow of this decoding processing will be described with reference to the flowchart of FIG. 20.

When the decoding processing is started, the storage unit 201 of the decoding device 200 stores the supplied encoded data of point cloud data. Then, in step S201, the storage unit 201 supplies the encoded data of the top node of the reference structure (prediction tree) of the geometry data to the stack 202 which in turn saves (stores) it.

In step S202, the geometry data decoding unit 203 acquires the encoded data of the geometry data of the last stored point (node) and the like from the stack 202. The attribute data decoding unit 205 acquires the encoded data of the attribute data of the last stored point (node) and the like from the stack 202. The child node processing unit 206 acquires the encoded data of the child node information of the last stored point (node) and the like from the stack 202.

In step S203, the geometry data decoding unit 203 executes geometry data decoding processing to decode the encoded data of the geometry data and the like acquired in step S202.

In step S204, the coordinate transformation unit 204 determines whether the geometry data is in a polar coordinate system. If it is determined that the geometry data is in a polar coordinate system, the processing proceeds to step S205.

In step S205, the coordinate transformation unit 204 performs coordinate transformation to transform the coordinate system for the geometry data from the polar coordinate system to a Cartesian coordinate system. When the processing of step S205 ends, the processing proceeds to step S206. If it is determined in step S204 that the coordinate system of the geometry data is not a polar coordinate system (it is a Cartesian coordinate system), the processing of step S205 is skipped (bypassed) and then the processing proceeds to step S206.

In step S206, the attribute data decoding unit 205 executes attribute data decoding processing to decode the encoded data of the attribute data and the like.

In step S207, the child node processing unit 206 decodes the encoded data of the child node information and the like.

In step S208, the child node processing unit 206 determines whether to decode the child node of the processing target point. If the processing target point is not a leaf node of the tree structure but has a child node and it is determined that the child node is also to be decoded, the processing proceeds to step S209.

In step S209, the child node processing unit 206 controls the storage unit 201 to supply the child node information (geometry data, attribute data, child node information, etc.) to the stack 202 which in turn holds them. When the processing of step S209 ends, the processing proceeds to step S210. If it is determined in step S208 that any child node is not to be decoded because, for example, there is no child node of the processing target point (for example, the processing target point is a leaf node of the tree structure), the processing of S209 is skipped (bypassed) and then the processing proceeds to step S210.

In step S210, the geometry data decoding unit 203 determines whether the stack 202 is empty. If it is determined that the stack 202 is not empty (that is, information of at least one point is stored), the processing returns to step S202. Thus, the processing from step S202 to step S210 is executed with the point stored last in the stack 202 as the processing target point.

While such processing is repeated, if it is determined in step S210 that the stack is empty, the decoding processing ends.

<Flow of Geometry Decoding Processing>

Next, an example of the flow of the geometry data decoding processing executed in step S203 of FIG. 20 will be described with reference to the flowchart of FIG. 21.

When the geometry data decoding processing is started, the decoding unit 241 decodes the encoded data of the geometry data to generate the prediction residual of the geometry data in step S241.

In step S242, the decoding unit 241 decodes the encoded data of the prediction mode information to generate the prediction mode information of the geometry data.

In step S243, the geometry data generation unit 242 calculates a predictive value of the geometry data of the processing target point in the prediction mode indicated by the prediction mode information obtained by the processing of step S242. The geometry data generation unit 242 then adds the predictive value to the prediction residual obtained by the processing of step S241 to generate geometry data for the processing target point.

In step S244, the predicted point generation unit 243 calculates and adds a predicted point.

Figure 20:
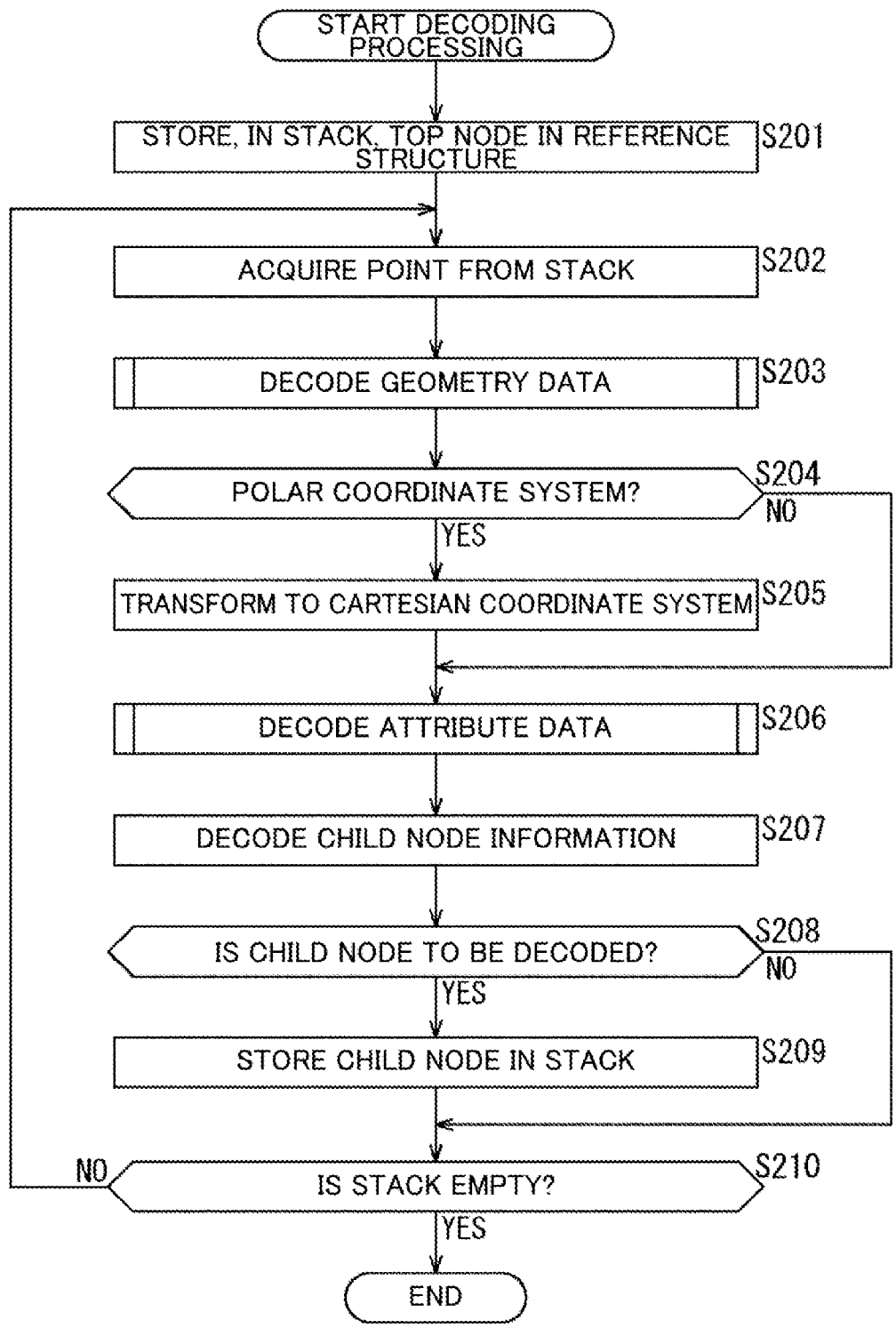
FIG. 20 is a flowchart for describing an example of a flow of decoding processing.
Figure 21:
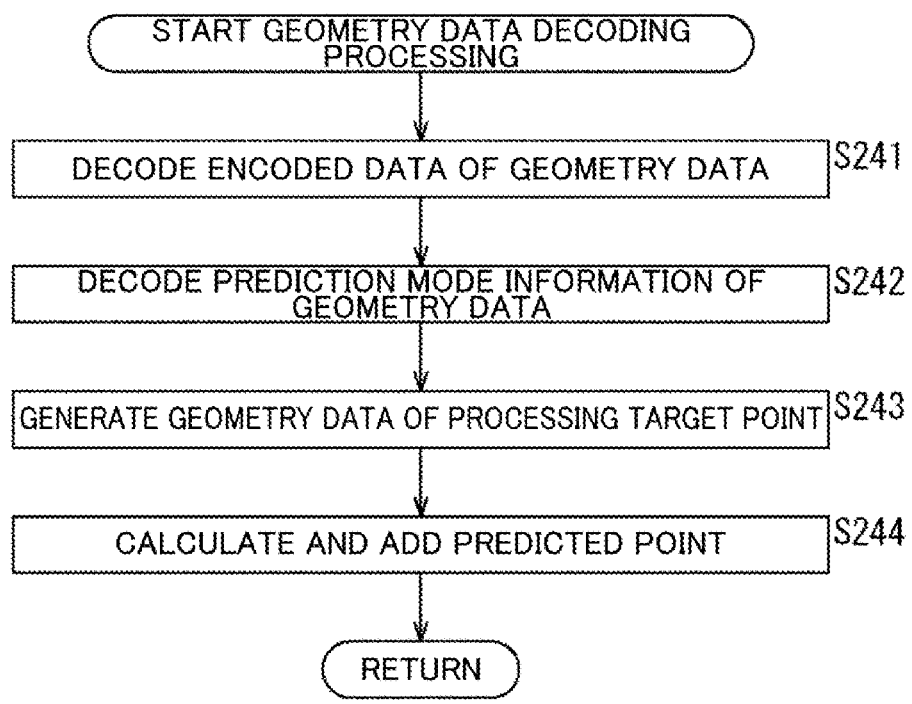
FIG. 21 is a flowchart illustrating an example of a flow of geometry data decoding processing.

When the processing of step S244 ends, the geometry data decoding processing ends and then the processing returns to FIG. 20.

<Flow of Attribute Data Decoding Processing>

Figure 22:
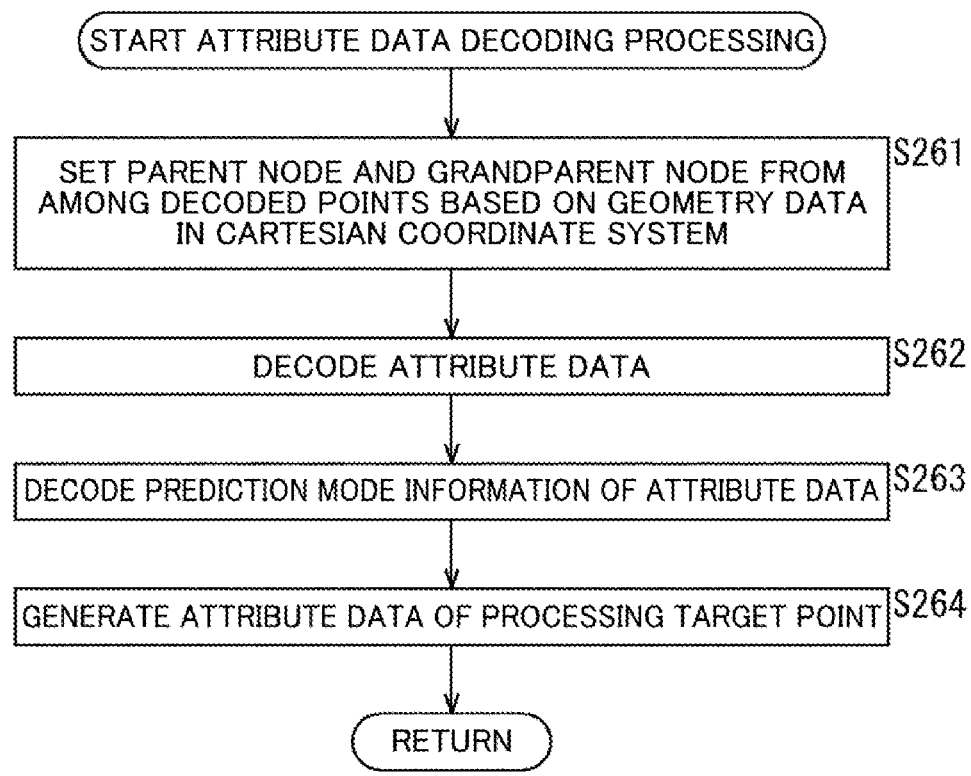
FIG. 22 is a flowchart illustrating an example of a flow of attribute data decoding processing.

Next, an example of the flow of the attribute data decoding processing executed in step S206 of FIG. 20 will be described with reference to the flowchart of FIG. 22.

When the attribute data decoding processing is started, in step S261, the reference relationship setting unit 261 sets a parent node and a grandparent node from among the decoded points based on the geometry data in the Cartesian coordinate system.

In step S262, the decoding unit 262 decodes the encoded data of the prediction residual of the attribute data to generate the prediction residual of the processing target point.

In step S263, the decoding unit 262 decodes the encoded data of the prediction mode information of the attribute data to generate the prediction mode information of the processing target point.

In step S264, the attribute data generation unit 263 generates attribute data of the processing target point by using that information. For example, the attribute data generation unit 263 calculates a predictive value of the geometry data of the processing target point in the prediction mode indicated by the prediction mode information obtained by the processing of step S263. The attribute data generation unit 263 then adds the predictive value to the prediction residual obtained by the processing of step S262 to generate attribute data for the processing target point.

When the processing of step S264 ends, the attribute data decoding processing ends and then the processing returns to FIG. 20.

Each processing executed as described above makes it possible to set a reference relationship of the attribute data based on the geometry data in the Cartesian coordinate system, so that a reduction in encoding efficiency can be suppressed as described above in <1. Coordinate System Transformation>.

4. Supplements

<Computer>

The above-described series of processing can be executed by hardware or software. In the case where the series of processes are executed by software, a program that configures the software is installed on a computer. Here, the computer includes, for example, a computer built in dedicated hardware and a general-purpose personal computer on which various programs are installed to be able to execute various functions.

Figure 23:
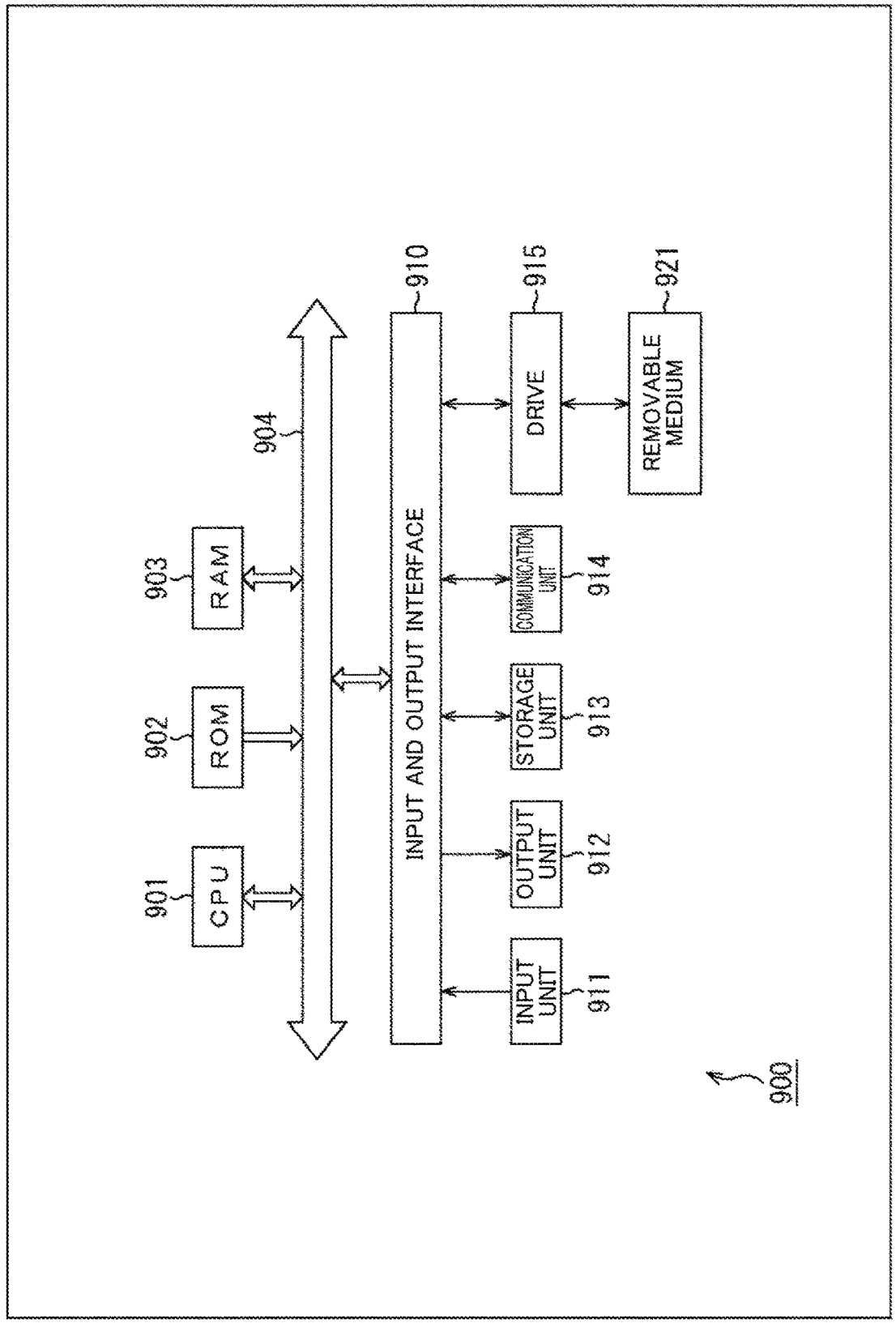
FIG. 23 is a block diagram illustrating a main configuration example of a computer.

FIG. 23 is a block diagram illustrating an example of a hardware configuration of a computer that executes the above-described series of processing according to a program.

In the computer 900 illustrated in FIG. 23, a central processing unit (CPU) 901, a read only memory (ROM) 902, and a random access memory (RAM) 903 are connected to each other via a bus 904.

An input and output interface 910 is also connected to the bus 904. An input unit 911, an output unit 912, a storage unit 913, a communication unit 914, and a drive 915 are connected to the input and output interface 910.

The input unit 911 is, for example, a keyboard, a mouse, a microphone, a touch panel, or an input terminal. The output unit 912 is, for example, a display, a speaker, or an output terminal. The storage unit 913 includes, for example, a hard disk, a RAM disk, and non-volatile memory. The communication unit 914 includes, for example, a network interface. The drive 915 drives a removable medium 921 such as a magnetic disk, an optical disc, a magneto-optical disk, or a semiconductor memory.

In the computer configured as described above, the CPU 901 loads a program stored in the storage unit 913 into the RAM 903 via the input and output interface 910 and the bus 904 and executes the program, so that the above-described series of processing is performed. The RAM 903 also appropriately stores data and the like necessary for the CPU 901 to execute various types of processing.

The program executed by the computer can be recorded in, for example, the removable medium 921 as a package medium or the like and provided in such a form. In this case, the program can be installed in the storage unit 913 via the input and output interface 910 by the removable medium 921 being mounted in the drive 915.

This program can also be provided via wired or wireless transfer medium such as a local area network, the Internet, and digital satellite broadcasting. In this case, the program can be received by the communication unit 914 and installed in the storage unit 913.

In addition, this program can be installed in advance in the ROM 902, the storage unit 913, or the like.

<Application Target of Present Technology>

Although a case in which the present technology is applied to encoding and decoding of the point cloud data has been described above, the present technology is not limited to these examples and can be applied to encoding and decoding of 3D data having any standard. For example, in encoding and decoding of mesh data, the mesh data may be transformed into point cloud data, and encoding and decoding may be performed by applying the present technology. In other words, any of various types of processing such as encoding and decoding schemes and any of specifications of various types of data such as 3D data or metadata can be used as long as the processing and specifications are not contradict with the above-described present technology. Some of the above-described processing or specifications may be omitted as long as the processing and specifications are consistent with the present technology.

The present technology can be applied to any configuration. For example, the present technology can be applied to various electronic devices such as a transmitter or a receiver (for example, a television receiver or a mobile phone) in wired broadcasting of a satellite broadcasting, a cable TV, or the like, transmission on the Internet, or delivery to a terminal through cellular communication, or a device (for example, a hard disk recorder or a camera) recording an image on a medium such as an optical disc, a magnetic disk, and a flash memory or reproducing an image from the storage medium.

Further, for example, the present technology can be implemented as a part of the configuration of the device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) in which other functions are added to the unit.

Further, for example, the present technology can also be applied to a network system configured of a plurality of devices. For example, the present technology may be implemented as cloud computing in which a plurality of devices share processing and jointly perform processing via a network. For example, the present technology may be implemented in a cloud service in which a service regarding images (moving images) is provided to any terminals such as computers, audio visual (AV) device, portable information processing terminals, and Internet of Things (IoT) devices.

In the present specification, the system is a set of a plurality of constituent elements (devices, modules (components), or the like) and all the constituent elements may not be in the same casing. Accordingly, a plurality of devices accommodated in separate housings and connected via a network, and a single device in which a plurality of modules are housed in a single housing are both "systems".

<Fields and Purposes to which Present Technology is Applicable>

A system, device, a processing unit, and the like to which the present technology is applied can be used in any field such as traffic, medical treatment, security, agriculture, livestock industries, a mining industry, beauty, factories, home appliance, weather, and natural surveillance, for example. The application of the present technique can also be implemented as desired.

<Others>

The embodiments of the present technology are not limited to the above-described embodiments, and various modifications can be made without departing from the scope and spirit of the present technology.

For example, the configuration described as one device (or processing unit) may be divided into and configured as a plurality of devices (or processing units). In contrast, the configuration described above as a plurality of devices (or processing units) may be collectively configured as one device (or processing unit). Further, of course, a component other than those in the above-described configurations may be added to the configuration of each device (or each processing unit). Further, one or some of the components of a device (or processing unit) may be included in the configuration of another device (or another processing unit) as long as the configuration or operation of the system as a whole is substantially the same.

Further, for example, the above-described program may be executed in any device. In this case, the device only needs to have necessary functions (functional blocks, etc.) and to be able to obtain necessary information.

For example, each step of one flowchart may be executed by one device or may be shared and executed by a plurality of devices. Further, when a plurality of types of processing are included in one step, the plurality of types of processing may be performed by one device or may be shared and performed by a plurality of devices. In other words, a plurality of types of processing included in one step can also be executed as processing of a plurality of steps. In contrast, processing described as a plurality of steps can be collectively performed as one step.

For example, for a program executed by a computer, processing of steps describing the program may be performed chronologically in order described in the present specification or may be performed in parallel or individually at a necessary timing such as the time of calling. In other words, processing of each step may be performed in order different from the above-described order as long as inconsistency does not occur. Further, processing of steps describing the program may be performed in parallel to processing of another program or may be performed in combination with processing of another program.

For example, a plurality of technologies related to the present technology can be implemented independently alone as long as inconsistency does not occur. Of course, any plurality of technologies may be implemented together. For example, some or all of the present technologies described in several embodiments may be implemented in combination with some or all of the present technologies described in the other embodiments. Further, a part or all of any above-described present technology can also be implemented together with another technology which has not been described above.

The present technology can also be configured as follows.

(1) An information processing device including:
a coordinate transformation unit that transforms, for a point cloud representing a three-dimensional object as a set of points, a coordinate system for geometry data from a polar coordinate system to a Cartesian coordinate system;
a reference relationship setting unit that sets, by using the geometry data in the Cartesian coordinate system generated by the coordinate transformation unit, a reference relationship indicating a reference destination used to calculate a predictive value of attribute data of a processing target point;
a prediction residual calculation unit that calculates a prediction residual that is a difference value between the attribute data of the processing target point and the predictive value calculated based on the reference relationship set by the reference relationship setting unit; and
a prediction residual encoding unit that encodes the prediction residual calculated by the prediction residual calculation unit.

(2) The information processing device according to (1), wherein the reference relationship setting unit sets the reference relationship based on a distance from the processing target point in the Cartesian coordinate system.

(3) The information processing device according to (1) or (2), wherein the reference relationship setting unit selects a parent node and a grandparent node from among points that are to be decoded prior to the processing target point during decoding.

(4) The information processing device according to any one of (1) to (3), further including a geometry data encoding unit that encodes the geometry data in a predictive mode,
wherein the coordinate transformation unit transforms the coordinate system for the geometry data to be encoded in the predictive mode by the geometry data encoding unit from the polar coordinate system to the Cartesian coordinate system.

(5) The information processing device according to (4), wherein the reference relationship setting unit sets the reference relationship for the attribute data corresponding to the processing target node of the geometry data encoding unit in a prediction tree in the predictive mode.

(6) The information processing device according to (4) or (5), further including a prediction mode setting unit that sets a prediction mode in which the predictive value is calculated,
wherein the prediction residual calculation unit calculates the prediction residual by using the predictive value calculated in the prediction mode set by the prediction mode setting unit.

(7) The information processing device according to (6), wherein the prediction mode setting unit selects the prediction mode to be applied from among a plurality of candidates prepared in advance.

(8) The information processing device according to any one of (4) to (7), wherein for a plurality of pieces of attribute data whose corresponding geometries are same, the prediction residual calculation unit sorts the plurality of pieces of attribute data according to magnitude of their values, and
calculates a difference value between consecutive pieces of attribute data in a sort order.

(9) The information processing device according to any one of (4) to (8), wherein the prediction residual calculation unit applies wrap around to calculate the prediction residual.

(10) An information processing method including:
transforming, for a point cloud representing a three-dimensional object as a set of points, a coordinate system for geometry data from a polar coordinate system to a Cartesian coordinate system;

setting, by using the generated geometry data in the Cartesian coordinate system, a reference relationship indicating a reference destination used to calculate a predictive value of attribute data of a processing target point;
calculating a prediction residual that is a difference value between the attribute data of the processing target point and the predictive value calculated based on the set reference relationship; and
encoding the calculated prediction residual.

(11) An information processing device including:
a coordinate transformation unit that transforms, for a point cloud representing a three-dimensional object as a set of points, a coordinate system for geometry data from a polar coordinate system to a Cartesian coordinate system;
a reference relationship setting unit that sets, by using the geometry data in the Cartesian coordinate system generated by the coordinate transformation unit, a reference relationship indicating a reference destination used to calculate a predictive value of attribute data of a processing target point;
a prediction residual decoding unit that decodes encoded data to calculate a prediction residual that is a difference value between the attribute data and the predictive value; and
an attribute data generation unit that generates the attribute data by addition of the prediction residual calculated by the prediction residual decoding unit and the predictive value calculated based on the reference relationship set by the reference relationship setting unit.

(12) The information processing device according to (11), wherein the reference relationship setting unit sets the reference relationship based on a distance from the processing target point in the Cartesian coordinate system.

(13) The information processing device according to (11) or (12), wherein the reference relationship setting unit selects a parent node and a grandparent node from among points that are to be decoded prior to the processing target point by the prediction residual decoding unit.

(14) The information processing device according to any one of (11) to (13), further including a geometry data decoding unit that decodes encoded data of the geometry data encoded in a predictive mode,
wherein the coordinate transformation unit transforms the coordinate system of the geometry data generated by the geometry data decoding unit from the polar coordinate system to the Cartesian coordinate system.

(15) The information processing device according to (14), wherein the reference relationship setting unit sets the reference relationship for the attribute data corresponding to the processing target node of the geometry data decoding unit in a prediction tree in the predictive mode.

(16) The information processing device according to (14) or (15), wherein the prediction residual decoding unit further decodes encoded data of prediction mode information indicating a prediction mode in which the predictive value is calculated, and
the attribute data generation unit generates the attribute data by using the predictive value calculated by applying the prediction mode indicated by the prediction mode information generated by the prediction residual decoding unit.

(17) The information processing device according to (16), wherein the attribute data generation unit calculates the predictive value by applying the prediction mode indicated by the prediction mode information generated by the prediction residual decoding unit, and generates the attribute data by using the calculated predictive value.

(18) The information processing device according to any one of (14) to (17), wherein for a plurality of pieces of attribute data whose corresponding geometries are same, the attribute data generation unit generates each of the pieces of attribute data by addition of a difference value between pieces of attribute data that are consecutive in a sort order.

(19) The information processing device according to any one of (14) to (18), wherein the attribute data generation unit applies wrap around to generate the attribute data.

(20) An information processing method including:
transforming, for a point cloud representing a three-dimensional object as a set of points, a coordinate system for geometry data from a polar coordinate system to a Cartesian coordinate system;
setting, by using the generated geometry data in the Cartesian coordinate system, a reference relationship indicating a reference destination used to calculate a predictive value of attribute data of a processing target point; decoding encoded data to calculate a prediction residual that is a difference value between the attribute data and the predictive value; and
generating the attribute data by addition of the calculated prediction residual and the predictive value calculated based on the set reference relationship.

REFERENCE SIGNS LIST

100 Encoding device
101 Reference structure forming unit
102 Stack unit
103 Geometry data encoding unit
104 Coordinate transformation unit
105 Attribute data encoding unit
106 Child node processing unit
141 Prediction mode setting unit
142 Prediction residual calculation unit
143 Encoding unit
144 Prediction point generation unit
161 Reference relationship setting unit
162 Prediction mode setting unit
163 Prediction residual calculation unit
164 Encoding unit
200 Decoding device
201 Storage unit
202 Stack
203 Geometry data decoding unit
204 Coordinate transformation unit
205 Attribute data decoding unit
206 Child node processing unit
241 Decoding unit
242 Geometry data generation unit
243 Predicted point generation unit
261 Reference relationship setting unit
262 Decoding unit
263 Attribute data generation unit
900 Computer

The invention claimed is:

1. An information processing device comprising:
a coordinate transformation unit that transforms, for a point cloud representing a three-dimensional object as a set of points, a coordinate system for geometry data from a polar coordinate system to a Cartesian coordinate system;
a reference relationship setting unit that sets, by using the geometry data in the Cartesian coordinate system generated by the coordinate transformation unit, a reference relationship indicating a reference destination used to calculate a predictive value of attribute data of a processing target point;
a prediction residual calculation unit that calculates a prediction residual that is a difference value between the attribute data of the processing target point and the predictive value calculated based on the reference relationship set by the reference relationship setting unit; and
a prediction residual encoding unit that encodes the prediction residual calculated by the prediction residual calculation unit.

2. The information processing device according to claim 1, wherein the reference relationship setting unit sets the reference relationship based on a distance from the processing target point in the Cartesian coordinate system.

3. The information processing device according to claim 1, wherein the reference relationship setting unit selects a parent node and a grandparent node from among points that are to be decoded prior to the processing target point during decoding.

4. The information processing device according to claim 1, further comprising a geometry data encoding unit that encodes the geometry data in a predictive mode,
wherein the coordinate transformation unit transforms the coordinate system for the geometry data to be encoded in the predictive mode by the geometry data encoding unit from the polar coordinate system to the Cartesian coordinate system.

5. The information processing device according to claim 4, wherein the reference relationship setting unit sets the reference relationship for the attribute data corresponding to the processing target node of the geometry data encoding unit in a prediction tree in the predictive mode.

6. The information processing device according to claim 4, further comprising a prediction mode setting unit that sets a prediction mode in which the predictive value is calculated,
wherein the prediction residual calculation unit calculates the prediction residual by using the predictive value calculated in the prediction mode set by the prediction mode setting unit.

7. The information processing device according to claim 6, wherein the prediction mode setting unit selects the prediction mode to be applied from among a plurality of candidates prepared in advance.

8. The information processing device according to claim 4, wherein for a plurality of pieces of attribute data whose corresponding geometries are same, the prediction residual calculation unit sorts
the plurality of pieces of attribute data according to magnitude of their values, and
calculates a difference value between consecutive pieces of attribute data in a sort order.

9. The information processing device according to claim 4, wherein the prediction residual calculation unit applies wrap around to calculate the prediction residual.

10. An information processing method comprising:
transforming, for a point cloud representing a three-dimensional object as a set of points, a coordinate system for geometry data from a polar coordinate system to a Cartesian coordinate system;
setting, by using the generated geometry data in the Cartesian coordinate system, a reference relationship indicating a reference destination used to calculate a predictive value of attribute data of a processing target point;
calculating a prediction residual that is a difference value between the attribute data of the processing target point and the predictive value calculated based on the set reference relationship; and
encoding the calculated prediction residual.

11. An information processing device comprising:
a coordinate transformation unit that transforms, for a point cloud representing a three-dimensional object as a set of points, a coordinate system for geometry data from a polar coordinate system to a Cartesian coordinate system;
a reference relationship setting unit that sets, by using the geometry data in the Cartesian coordinate system generated by the coordinate transformation unit, a reference relationship indicating a reference destination used to calculate a predictive value of attribute data of a processing target point;
a prediction residual decoding unit that decodes encoded data to calculate a prediction residual that is a difference value between the attribute data and the predictive value; and
an attribute data generation unit that generates the attribute data by addition of the prediction residual calculated by the prediction residual decoding unit and the predictive value calculated based on the reference relationship set by the reference relationship setting unit.

12. The information processing device according to claim 11, wherein the reference relationship setting unit sets the reference relationship based on a distance from the processing target point in the Cartesian coordinate system.

13. The information processing device according to claim 11, wherein the reference relationship setting unit selects a parent node and a grandparent node from among points that are to be decoded prior to the processing target point by the prediction residual decoding unit.

14. The information processing device according to claim 11, further comprising a geometry data decoding unit that decodes encoded data of the geometry data encoded in a predictive mode,
wherein the coordinate transformation unit transforms the coordinate system of the geometry data generated by the geometry data decoding unit from the polar coordinate system to the Cartesian coordinate system.

15. The information processing device according to claim 14, wherein the reference relationship setting unit sets the reference relationship for the attribute data corresponding to the processing target node of the geometry data decoding unit in a prediction tree in the predictive mode.

16. The information processing device according to claim 14, wherein
the prediction residual decoding unit further decodes encoded data of prediction mode information indicating a prediction mode in which the predictive value is calculated, and
the attribute data generation unit generates the attribute data by using the predictive value calculated by applying the prediction mode indicated by the prediction mode information generated by the prediction residual decoding unit.

17. The information processing device according to claim 16, wherein the attribute data generation unit calculates the predictive value by applying the prediction mode indicated by the prediction mode information generated by the prediction residual decoding unit, and generates the attribute data by using the calculated predictive value.

18. The information processing device according to claim 14, wherein for a plurality of pieces of attribute data whose corresponding geometries are same, the attribute data generation unit generates each of the pieces of attribute data by addition of a difference value between pieces of attribute data that are consecutive in a sort order.

19. The information processing device according to claim 14, wherein the attribute data generation unit applies wrap around to generate the attribute data.

20. An information processing method comprising:
transforming, for a point cloud representing a three-dimensional object as a set of points, a coordinate system for geometry data from a polar coordinate system to a Cartesian coordinate system;
setting, by using the generated geometry data in the Cartesian coordinate system, a reference relationship indicating a reference destination used to calculate a predictive value of attribute data of a processing target point;
decoding encoded data to calculate a prediction residual that is a difference value between the attribute data and the predictive value; and
generating the attribute data by addition of the calculated prediction residual and the predictive value calculated based on the set reference relationship.

* * * * *